(12) United States Patent
Wang et al.

(10) Patent No.: US 10,727,925 B2
(45) Date of Patent: Jul. 28, 2020

(54) METHOD AND APPARATUS FOR SUPPORTING MOVEMENT OF USER EQUIPMENT IN WIRELESS COMMUNICATIONS

(71) Applicant: Samsung Electronics Co., Ltd., Gyeonggi-do (KR)

(72) Inventors: Hong Wang, Beijing (CN); Lixiang Xu, Beijing (CN); Xiaowan Ke, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/324,727

(22) PCT Filed: Aug. 10, 2017

(86) PCT No.: PCT/KR2017/008696
§ 371 (c)(1),
(2) Date: Feb. 11, 2019

(87) PCT Pub. No.: WO2018/030819
PCT Pub. Date: Feb. 15, 2018

(65) Prior Publication Data
US 2019/0222291 A1    Jul. 18, 2019

(30) Foreign Application Priority Data
Aug. 11, 2016  (CN) .......................... 2016 1 0658401

(51) Int. Cl.
*H04L 1/02* (2006.01)
*H04B 7/06* (2006.01)
(Continued)

(52) U.S. Cl.
CPC ........... *H04B 7/0695* (2013.01); *H04B 7/005* (2013.01); *H04B 7/0619* (2013.01);
(Continued)

(58) Field of Classification Search
CPC .... H04B 7/0695; H04B 7/005; H04B 7/0619; H04W 36/0085; H04W 24/10;
(Continued)

(56) References Cited

U.S. PATENT DOCUMENTS

2016/0150435 A1   5/2016  Baek et al.
2016/0192433 A1   6/2016  Deenoo et al.
(Continued)

FOREIGN PATENT DOCUMENTS

| WO | WO 2015080645 | 6/2015 |
| WO | WO 2015080648 | 6/2015 |
| WO | WO 2016093390 | 6/2016 |

OTHER PUBLICATIONS

PCT/ISA/210 Search Report issued on PCT/KR2017/008696 (pp. 3).
PCT/ISA/237 Written Opinion issued on PCT/KR2017/008696 (pp. 6).

*Primary Examiner* — Helene E Tayong
(74) *Attorney, Agent, or Firm* — The Farrell Law Firm, P.C.

(57) ABSTRACT

In accordance with an aspect of the present disclosure, a method for supporting movement of a user equipment (UE) by a central unit (CU) in wireless communications is provided. The method includes transmitting beam measurement configuration information to the UE; and receiving information of a candidate beam transmitted by a distributed unit (DU); wherein the information of the candidate beam is obtained by the DU based on a beam measurement result, and wherein the beam measurement result is obtained by the UE through measuring one or more beam signals based on the beam measurement configuration information.

14 Claims, 4 Drawing Sheets

(51) Int. Cl.
  *H04W 24/10* (2009.01)
  *H04W 36/06* (2009.01)
  *H04W 88/08* (2009.01)
  *H04W 36/00* (2009.01)
  *H04B 7/005* (2006.01)
  *H04W 16/28* (2009.01)

(52) U.S. Cl.
  CPC ........... *H04W 24/10* (2013.01); *H04W 36/00* (2013.01); *H04W 36/0058* (2018.08); *H04W 36/0085* (2018.08); *H04W 36/06* (2013.01); *H04W 88/085* (2013.01); *H04W 16/28* (2013.01)

(58) Field of Classification Search
  CPC ... H04W 36/00; H04W 36/06; H04W 88/085; H04W 16/28
  USPC .......................................................... 375/267
  See application file for complete search history.

(56) References Cited

U.S. PATENT DOCUMENTS

2017/0230780 A1* 8/2017 Chincholi ............... H04W 4/70
2018/0109302 A1* 4/2018 Nagaraja ............... H04W 24/02

* cited by examiner

[Fig. 1]
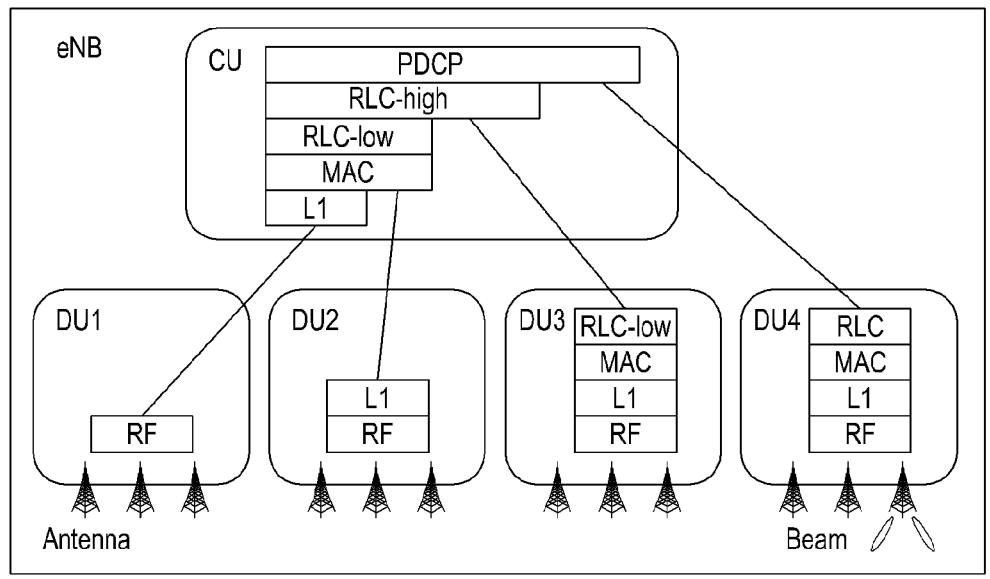
[Fig. 2]
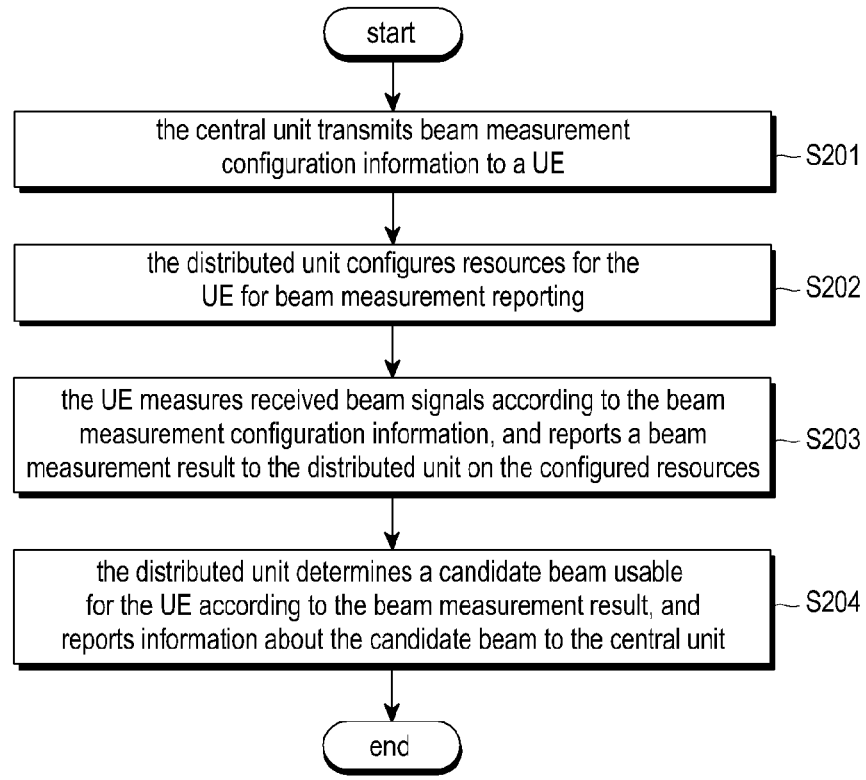

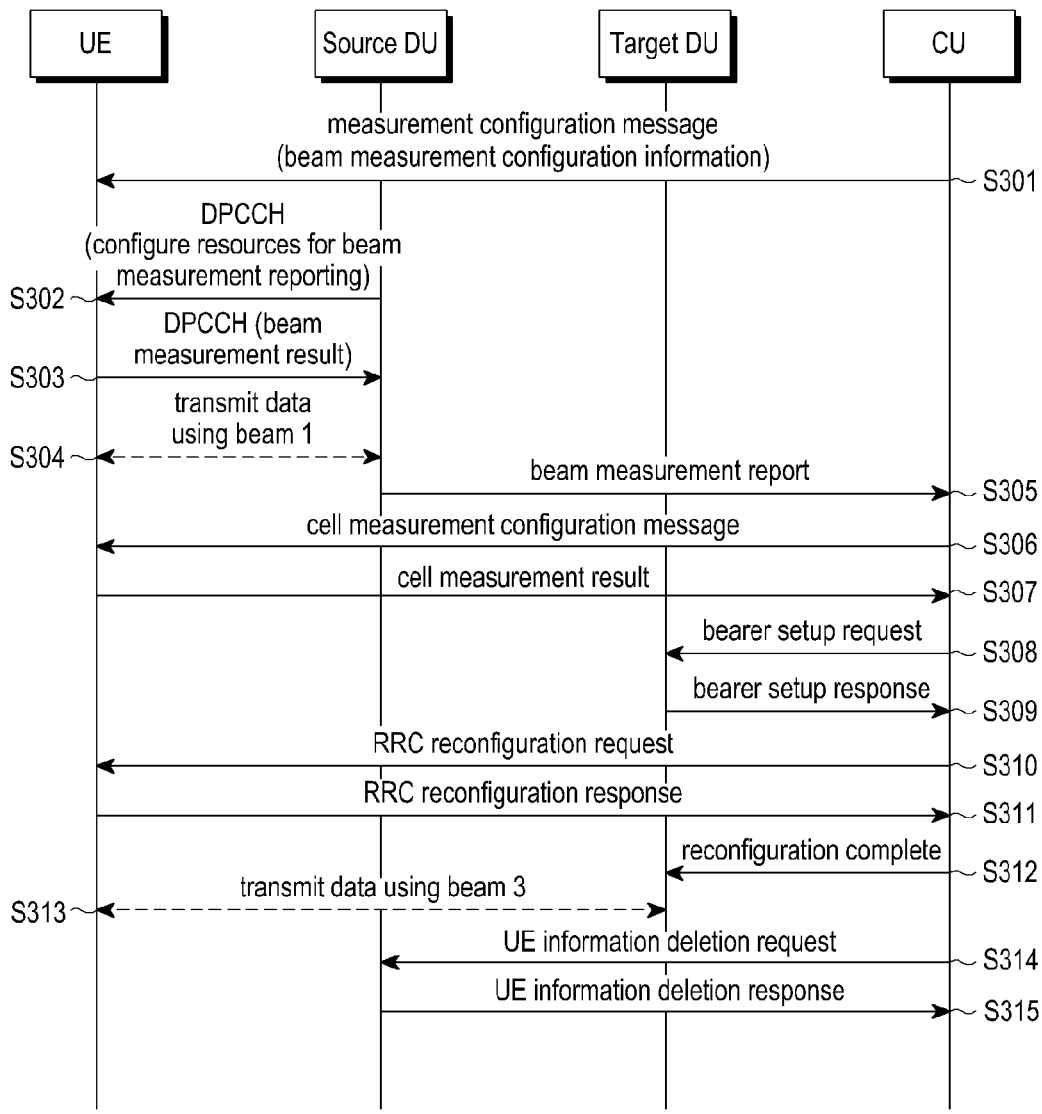
[Fig. 3]

[Fig. 4]
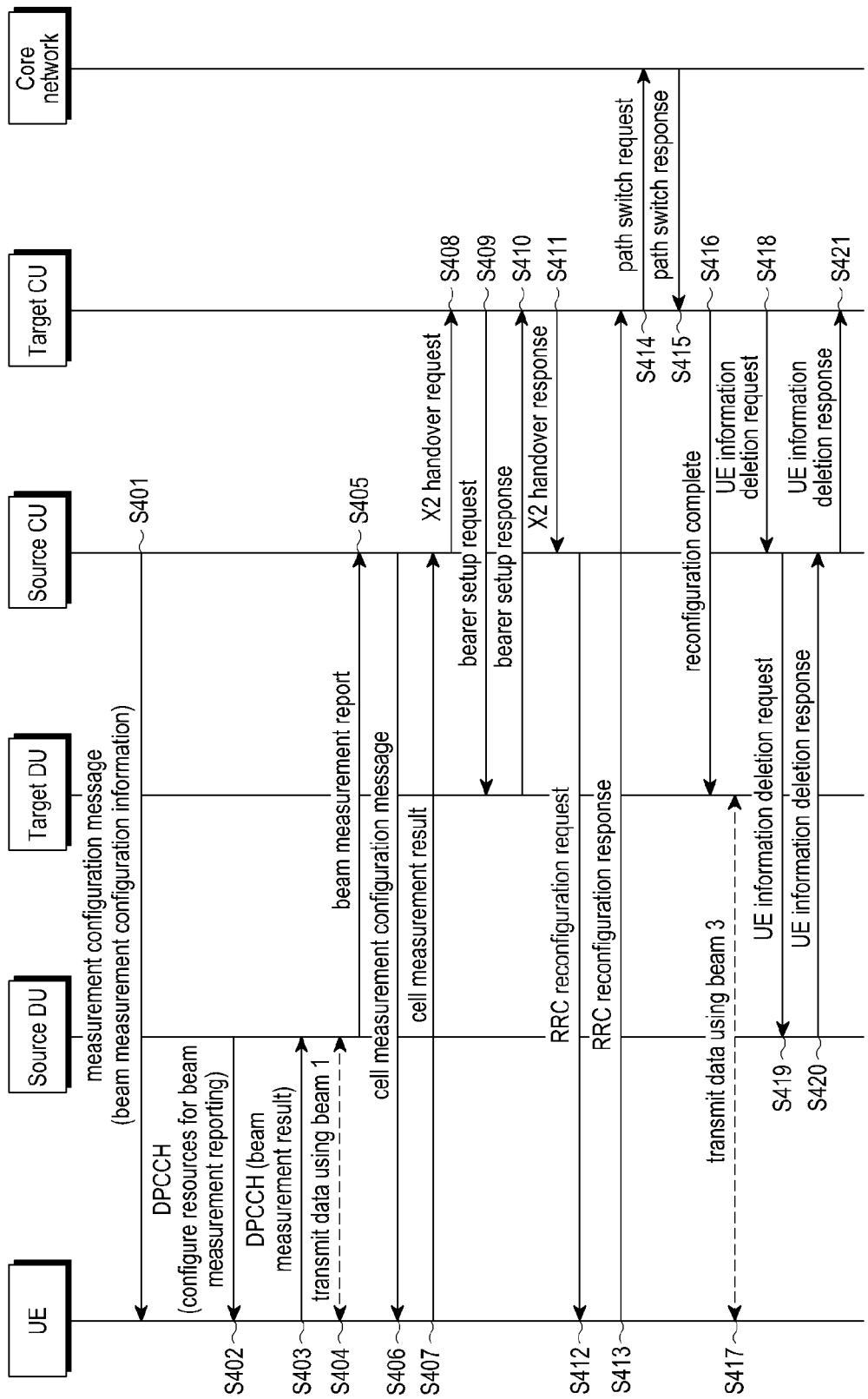

[Fig. 5]
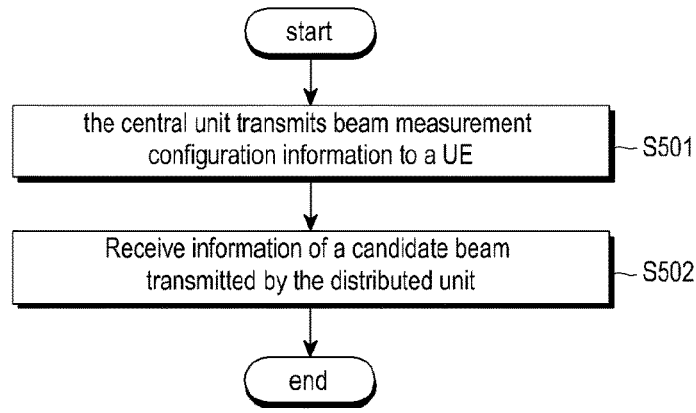
[Fig. 6]
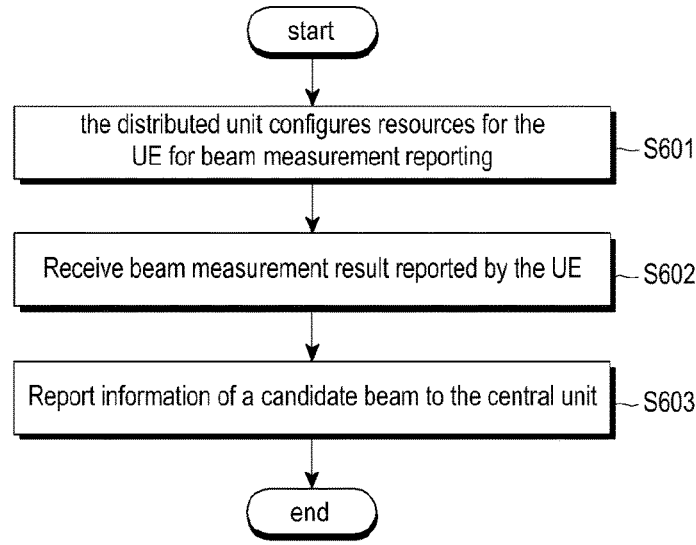
[Fig. 7]
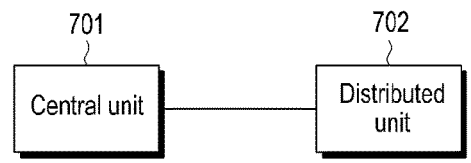
[Fig. 8]
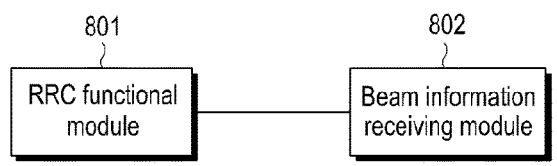
[Fig. 9]
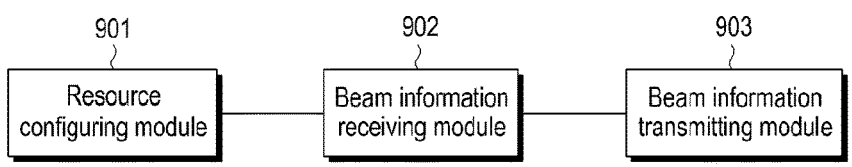

METHOD AND APPARATUS FOR SUPPORTING MOVEMENT OF USER EQUIPMENT IN WIRELESS COMMUNICATIONS

PRIORITY

This application is a National Phase Entry of International Application No. PCT/KR2017/008696, which was filed on Aug. 10, 2017, and claims priority to Chinese Patent Application No. 201610658401.5, which was filed on Aug. 11, 2016, the content of each of which are incorporated herein by reference.

TECHNICAL FIELD

The present disclosure relates to wireless communications technologies, more particularly to a method and apparatus for supporting movement of a user equipment, wherein a base station includes a central unit and at least one distributed unit, the central unit implements functions of a control plane and some functions of a user plane, and the at least one distributed unit implements the other functions of the user plane.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

5G is not a single kind of wireless technique but is a combination of existing wireless communications techniques. At present, the peak rate of LTE may reach 100 Mbps, whereas the peak rate of 5G may reach 10 Gbps, increased by 100 times. The 4G networks have limited spontaneous processing abilities and cannot support some services such as high definition video, high quality voice, augmented reality and virtual reality, etc. 5G will introduce more advanced technologies to meet the increasing requirement of mobile services through higher spectrum efficiency, more spectrum resources and cells with higher density, so as to solve the problems of 4G and build a network with high transmission rate, high capacity, low latency, high reliability and better user experiences. The 5G architecture includes a 5G access network and a 5G core network. User equipment (UE) communicates with a data network through the access network and the core network.

DISCLOSURE OF INVENTION

Solution to Problem

Embodiments of the present disclosure provide a method and apparatus for supporting movement of a UE in wireless communications, so as to support movement of the UE.

According to some embodiments of the present disclosure, a method for supporting movement of a UE in wireless communications is provided. The method comprises a central unit transmitting beam measurement configuration information to a UE; a distributed unit configuring resources for the UE for beam measurement reporting; the UE measuring beam signals according to the beam measurement configuration information and reporting a beam measurement result to the distributed unit; and the distributed unit reporting information of a candidate beam to the central unit according to the beam measurement result.

In some embodiments, the method further comprises if the distributed unit is the one controlling the candidate beam, the distributed unit directly determining the candidate beam as a target beam, and performing data transmission with the UE via the target beam.

In some embodiments, the method further comprises the central unit transmitting cell measurement configuration information to the UE; the UE measuring signals of an adjacent cell according to the cell measurement configuration information, and reporting a cell measurement result to the central unit; the central unit determining a cell corresponding to the candidate beam to be a target cell according to the cell measurement result and determining a distributed unit corresponding to the target cell as a target distributed unit.

In some embodiments, the cell measurement configuration information and the beam measurement configuration information are carried in a measurement configuration message.

In some embodiments, the cell measurement result is transmitted in the beam measurement result to the distributed unit, and then forwarded to the central unit by the distributed unit.

In some embodiments, the method further comprises if the central unit is the one corresponding to a candidate distributed unit controlling a candidate beam, the central unit transmitting a bearer setup request message for the UE to the candidate distributed unit, wherein the candidate distributed unit is the one controlling a candidate beam, in response to the bearer setup request message, the candidate distributed unit allocates corresponding resources and transmits a bearer setup response message to the central unit; after determining the target cell, the central unit transmitting an RRC reconfiguration message for accessing the target cell to the UE; in response to the RRC reconfiguration message, the UE disconnects with the current cell and establishes a connection with the target cell and transmits an RRC reconfiguration response message to the central unit.

In some embodiments, the method further comprises: the central unit directly determining the candidate beam as a target beam, determining the cell that the candidate beam belongs to as a target cell, and determining the distributed unit corresponding to the target cell as the target distributed unit.

In some embodiments, the method may further comprise: if the central unit is the one corresponding to the target distributed unit, the central unit transmitting a bearer setup request message for the UE to the target distributed unit; in response to the bearer setup request message, the target distributed unit allocating corresponding resources, and transmitting a bearer setup response message to the central unit; the central unit transmitting an RRC reconfiguration message for accessing the target cell to the UE; in response to the RRC reconfiguration message, the UE disconnecting with the current cell and establishing a connection with the target cell, and transmitting an RRC reconfiguration response message to the central unit.

In some embodiments, the method may further comprise: the central unit determining whether to configure multiple connections for the UE according to information of the candidate beam, if the central unit is the one corresponding to the target distributed unit and it is determined to configure multiple connections for the UE, the central unit transmitting a cell/carrier add request message for the UE to the target distributed unit; the target distributed unit allocating corresponding resources in response to the cell/carrier add request message and transmitting a cell/carrier add response message to the central unit; the central unit transmitting an RRC reconfiguration message for accessing the target cell to the UE; in response to the RRC reconfiguration message, the UE keeping the connection with the current cell and establishing a connection with the target cell, and transmitting an RRC reconfiguration response message to the central unit.

In some embodiments, the connection manner of the multiple connections is relevant to a user plane functional split between the central unit and the target distributed unit.

In some embodiments, the bearer setup request message comprises: a cell ID, a beam identifier, and configurations corresponding to the bearer set up; the configurations corresponding to the bearer are relevant to the user plane functional split between the central unit and the target distributed unit.

In some embodiments, the method may further comprise: after the connection between the UE and the target cell is established, the central unit transmitting a deletion message to the distributed unit to indicate the distributed unit to delete information of the UE; in response to the deletion message, the distributed unit deleting the information of the UE, and transmitting a deletion response message to the central unit.

In some embodiments, the method may further comprise: after the connection between the UE and the target cell is established, the central unit transmitting a message to the target distributed unit to indicate that the UE is connected with the target cell.

In some embodiment, the method further comprises: if the central unit is not the one corresponding to the candidate distributed unit controlling the candidate beam, the central unit determining a candidate central unit corresponding to the candidate distributed unit, and transmitting a handover request message for the UE to the candidate central unit; in response to the handover request message, the candidate central unit transmitting a bearer setup request message for the UE to the candidate distributed unit; in response to the bearer setup request message, the candidate distributed unit allocating corresponding resources and transmitting a bearer setup response message to the candidate central unit; the candidate central unit transmitting a handover response message to the central unit; after determining the target cell, the central unit transmitting an RRC reconfiguration message for accessing the target cell to the UE; in response to the RRC reconfiguration message, the UE disconnecting with the current cell and establishing a connection with the target cell and transmitting an RRC reconfiguration response message to the candidate central unit; wherein the candidate distributed unit and the candidate central unit are respectively the distributed unit and the central unit corresponding to the candidate beam.

In some embodiments, the method may further comprise: if the central unit is not the one corresponding to the target distributed unit, the central unit determining a target central unit corresponding to the target distributed unit, and transmitting a handover request message for the UE to the target central unit; in response to the handover request message, the target central unit transmitting a bearer setup request message for the UE to the target distributed unit; in response to the bearer setup request message, the target distributed unit allocating corresponding resources and transmitting a bearer setup response message to the target central unit; the target central unit transmitting a handover response message to the central unit; the central unit transmitting an RRC reconfiguration message for accessing the target cell to the UE; in response to the RRC reconfiguration message, the UE disconnecting with the current cell and establishing a connection with the target cell and transmitting an RRC reconfiguration response message to the target central unit.

In some embodiments, the method may further comprise: the central unit determining whether to configure multiple connections for the UE according to the information of the candidate beam; if the central unit is not the one corresponding to the target distributed unit and it is determined to configure multiple connections for the UE, the central unit determining a target central unit corresponding to the target distribute unit, transmitting a cell/carrier add request message for the UE to the target central unit; the target central unit transmitting a cell/carrier add request message for the UE to the target distribute unit; in response to the cell/carrier add request message, the target distribute unit allocating corresponding resources and transmitting a cell/carrier add response message to the target central unit; the target central unit transmitting a cell/carrier add response message to the central unit; the central unit transmitting an RRC reconfiguration message for accessing the target cell to the UE; in response to the RRC reconfiguration message, the UE keeping the connection with the current cell and establishing a connection with the target cell, and transmitting an RRC reconfiguration response message to the central unit.

In some embodiments, the connection manner of the multiple connections is relevant to a user plane functional split between the target central unit and the target distribute unit.

In some embodiments, the method may further comprise: after the connection between the UE and the target cell is established, the target central unit transmitting a path switch request message to the core network to notify the core network that the UE is handed over to the target central unit; the core network transmitting a path switch response message to the target central unit.

In some embodiments, the method may further comprise: after the connection between the UE and the target cell is established, the central unit transmitting a path switch request message to the core network to notify the core network that the UE is handed over to the target central unit; the core network transmitting a path switch response message to the central unit.

In some embodiments, the method may further comprise: after the connection between the UE and the target cell is established, the target central unit transmitting a deletion message to the central unit informing the central unit to delete information of the UE; in response to the deletion message, the central unit deleting the information of the UE, and transmitting a deletion message to the distributed unit to indicate the distributed unit to delete the information of the UE; in response to the deletion message, the distributed unit deleting the information of the UE, and transmitting a deletion response message to the central unit; and the central unit transmitting a deletion response message to the target central unit.

In some embodiments, the method may further comprise: after the connection between the UE and the target cell is established, the target central unit transmitting a message to the target distributed unit to indicate the target distributed unit that the connection between the UE and the target cell is established.

In some embodiments, the bearer setup request message comprises: a cell ID, a beam identifier, and configurations corresponding to the bearer set up; wherein the configurations corresponding to the bearer is relevant to a user plane functional split between the target central unit and the target distributed unit.

In some embodiments, the method may further comprise: the central unit transmitting beam measurement configuration information to the distributed unit; the distributed unit saving the beam measurement configuration information in UE context.

According to some embodiments of the present disclosure, a base station is provided. The base station comprises: a central unit, to transmit beam measurement configuration information to a UE; and a distributed unit, to configure resources for the UE for beam measurement reporting, and report information of a candidate beam according to a beam measurement result reported by the UE; wherein the beam measurement result is obtained by the UE through measuring beam signals according to the beam measurement configuration information transmitted by the central unit.

In some embodiments, if the distributed unit is the one controlling the candidate beam, the distributed unit directly determines the candidate beam as a target beam, and performs data transmission with the UE via the target beam.

In some embodiments, the central unit transmits cell measurement configuration information to the UE, and determines a cell corresponding to the candidate beam to be a target cell according to a cell measurement result reported by the UE, and determines a distributed unit corresponding to the target cell as a target distributed unit.

In some embodiments, the cell measurement configuration information and the beam measurement configuration information are carried in a measurement configuration message.

In some embodiments, the cell measurement result is transmitted in a beam measurement result to the distributed unit, and is forwarded to the central unit by the distributed unit.

In some embodiments, if the central unit is the one corresponding to a candidate distributed unit controlling the candidate beam, the central unit transmits a bearer setup request message for the UE to the candidate distributed unit, receives a bearer setup response message transmitted by the candidate distributed unit; after determining the target cell, transmits an RRC reconfiguration message for accessing the target cell to the UE; receives an RRC reconfiguration response message transmitted by the UE; wherein the candidate distributed unit is the one controlling the candidate beam.

In some embodiments, the central unit directly determines the candidate beam as a target beam, determines the cell that the candidate beam belongs to as a target cell, and determines the distributed unit corresponding to the target cell as the target distributed unit.

In some embodiments, if the central unit is the one corresponding to the target distributed unit, the central unit transmits a bearer setup request message for the UE to the target distributed unit; after receiving a bearer setup response message transmitted by the target distributed unit, transmits an RRC reconfiguration message for accessing the target cell to the UE and receives an RRC reconfiguration response message transmitted by the UE.

In some embodiments, the central unit determines whether to configure multiple connections for the UE according to information of the candidate beam, if the central unit is the one corresponding to the target distributed unit and it is determined to configure multiple connections for the UE, the central unit transmits a cell/carrier add request message for the UE to the target distributed unit, after receiving a cell/carrier add response message transmitted by the target distributed unit, transmits an RRC reconfiguration message for accessing the target cell to the UE, and receives an RRC reconfiguration response message transmitted by the UE.

In some embodiments, the manner of the multiple connections is relevant to a user plane functional split between the central unit and the target distributed unit.

In some embodiments, the bearer setup request message comprises: a cell ID, a beam identifier, and configurations corresponding to the bearer to be set up; the configurations corresponding to the bearer are relevant to the user plane functional split between the central unit and the target distributed unit.

In some embodiments, after the connection between the UE and the target cell is established, the central unit transmits a deletion message to the distributed unit indicating the distributed unit to delete information of the UE, in response to the deletion message, the distributed unit deletes the information of the UE, and transmits a deletion response message to the central unit.

In some embodiments, after the connection between the UE and the target cell is established, the central unit transmits a message to the target distributed unit to indicate that the UE is connected with the target cell.

In some embodiment, if the central unit is not the one corresponding to the candidate distributed unit controlling the candidate beam, the central unit determines a candidate central unit corresponding to the candidate distributed unit, and transmits a handover request message for the UE to the candidate central unit, and receives a handover response message transmitted by the candidate central unit; after determining the target cell, the central unit transmits an RRC reconfiguration message for accessing the target cell to the UE and receives an RRC reconfiguration response message transmitted by the UE; wherein the candidate distributed unit and the candidate central unit are respectively the distributed unit and the central unit corresponding to the candidate beam.

In some embodiments, if the central unit is not the one corresponding to the target distributed unit, the central unit determines a target central unit corresponding to the target distributed unit, transmits a handover request message for the UE to the target central unit, receives a handover response message transmitted by the target central unit, transmits an RRC reconfiguration message for accessing the target cell to the UE, and receives an RRC reconfiguration response message transmitted by the UE.

In some embodiments, the central unit determines whether to configure multiple connections for the UE according to the information of the candidate beam, if the central unit is not the one corresponding to the target distributed unit and it is determined to configure multiple connections for the UE, the central unit determines a target central unit corresponding to the target distributed unit, transmits a cell/carrier add request message for the UE to the target central unit, receives a cell/carrier add response message transmitted by the target central unit, transmits an RRC reconfiguration message for accessing the target cell to the UE, and receives an RRC reconfiguration response message transmitted by the UE.

In some embodiments, the connection manner of the multiple connections is relevant to a user plane functional split between the target central unit and the target distributed unit.

In some embodiments, after the connection between the UE and the target cell is established, the central unit transmits a path switch request message to the core network to notify the core network that the UE is handed over to the target central unit; and receive a path switch response message transmitted by the core network.

In some embodiments, in response to the deletion message received from the target central unit, the central unit deletes the information of the UE, and transmits a deletion message to the distributed unit to indicate the distributed unit to delete the information of the UE, after receiving a deletion response message transmitted by the distributed unit, transmits a deletion response message to the target central unit; wherein the distributed unit deletes the information of the UE in response to the deletion message, and transmits the deletion message to the central unit.

In some embodiments, the bearer setup request message comprises: a cell ID, a beam identifier, and configurations corresponding to the bearer to be set up; the configurations corresponding to the bearer are relevant to the user plane functional split between the target central unit and the target distributed unit.

In some embodiments, the central unit transmits beam measurement configuration information to the distributed unit; wherein the distributed unit saves the beam measurement configuration information in UE context.

According to some embodiments of the present disclosure, a method for supporting movement of a UE in wireless communications is provided. The method comprises: a central unit transmitting beam measurement configuration information to a UE; receiving information of a candidate beam transmitted by a distributed unit; wherein the information of the candidate beam is obtained by the distributed unit based on a beam measurement result, the beam measurement result is obtained by the UE through measuring received beam signals according to beam measurement configuration information.

In some embodiments, the method may further comprise: the central unit transmitting cell measurement configuration information to the UE; receiving a cell measurement result obtained by the UE through measuring signals of an adjacent cell according to the cell measurement configuration information; determining a cell corresponding the candidate beam to be a target cell according to the cell measurement result, and determining a distributed unit corresponding to the target cell as a target distributed unit.

In some embodiments, the cell measurement configuration information and the beam measurement configuration information are carried in a measurement configuration message.

In some embodiments, the cell measurement result is transmitted in the beam measurement result to the distributed unit, and is forwarded to the central unit by the distributed unit.

In some embodiments, the method may further comprise: if the central unit is the one corresponding to the candidate distributed unit controlling the candidate beam, the central unit transmitting a bearer setup request for the UE to the candidate distributed unit; receiving a bearer setup response transmitted by the candidate distributed unit; after determining a target cell, transmitting an RRC reconfiguration message for accessing the target cell to the UE; and receiving an RRC reconfiguration response transmitted by the UE.

In some embodiments, the method may further comprise: directly determining the candidate beam as a target beam, determining the cell that the candidate beam belongs to as the target cell, determining a distributed unit corresponding to the target cell as the target distributed unit.

In some embodiments, the method may further comprise: if the central unit is the one corresponding to the target distributed unit, transmitting a bearer setup request for the UE to the target distributed unit; receiving a bearer setup response transmitted by the target distributed unit; transmitting an RRC reconfiguration message for accessing the target cell to the UE; and receiving an RRC reconfiguration response transmitted by the UE.

In some embodiments, the method may further comprise: determining whether to configure multiple connections for the UE according to information of the candidate beam; if the central unit is the one corresponding to the target distributed unit and it is determined to configure multiple connections for the UE, transmitting a cell/carrier add request of the UE to the target distributed unit; receiving a cell/carrier add response message transmitted by the target distributed unit; transmitting an RRC reconfiguration message for accessing the target cell to the UE; and receiving an RRC reconfiguration response message transmitted by the UE.

In some embodiments, the connection manner of the multiple connections is relevant to a user plane functional split between the central unit and the target distributed unit.

In some embodiments, the bearer setup request message comprises: a cell ID, a beam identifier, and configurations corresponding to the bearer to be set up; wherein the configurations corresponding to the bearer is relevant to the user plane functional split between the central unit and the target distributed unit.

In some embodiments, the method may further comprise: after the connection between the UE and the target cell is established, transmitting a deletion message to the distributed unit to indicate the distributed unit to delete information of the UE; and receiving a deletion response message transmitted by the distributed unit.

In some embodiments, the method may further comprise: after the connection between the UE and the target cell is established, transmitting a message to the target distributed unit to indicate that the UE is connected with the target cell.

In some embodiments, the method may further comprise: if the central unit is not the one corresponding to the candidate distributed unit, determining a candidate central unit corresponding to the candidate distributed unit, transmitting a handover request message for a UE to the candidate central unit; receiving a handover response message transmitted by the candidate central unit; after determining the target cell, transmitting an RRC reconfiguration message for accessing the target cell to the UE; and receiving an RRC reconfiguration response message transmitted by the UE.

In some embodiments, the method may further comprise: if the central unit is not the one corresponding to the target distributed unit, determining a target central unit corresponding to the target distributed unit, transmitting a handover request message for the UE to the target central unit; receiving a handover response message transmitted by the target central unit; transmitting an RRC reconfiguration message for accessing the target cell to the UE; and receiving an RRC reconfiguration response message transmitted by the UE.

In some embodiments, the method may further comprise: determining whether to configure multiple connections for the UE according to information of the candidate beam; if the central unit is not the one corresponding to the target distributed unit and it is determined to configure multiple connections for the UE, determining a target central unit corresponding the target distributed unit, transmitting a cell/carrier add request for the UE to the target central unit; receiving a cell/carrier add response message transmitted by the target central unit; transmitting an RRC reconfiguration message for accessing the target cell to the UE; and receiving an RRC reconfiguration response message transmitted by the UE.

In some embodiments, the connection manner of the multiple connections is relevant to a user plane functional split between the target central unit and the target distributed unit.

In some embodiments, the method may further comprise: after the connection between the UE and the target cell is established, transmitting a path switch request message to a core network to inform the core network that the UE is handed over to the target central unit; and receiving a path switch response message transmitted by the core network.

In some embodiments, the method may further comprise: after the connection between the UE and the target cell is established, receiving a deletion message transmitted by the target central unit indicating to delete information of the UE; in response to the deletion message, deleting information of the UE and transmitting a deletion message to the distributed unit to indicate the distributed unit to delete information of the UE; receiving a deletion response message transmitted by the distributed unit; and transmitting a deletion response message to the target central unit.

In some embodiments, the bearer setup request message comprises: a cell ID, a beam identifier, and configurations corresponding to the bearer to be set up; wherein the configurations corresponding to the bearer is relevant to a user plane functional split between the target central unit and the target distributed unit.

In some embodiments, the method may further comprise: transmitting beam measurement configuration information to the distributed unit.

In some embodiments, the method may further comprise: receiving a handover request message for another UE transmitted by another central unit, in response to the handover request message, transmitting a bearer setup request message for the another UE to a corresponding distributed unit; receiving a bearer setup response message transmitted by the corresponding distributed unit; and transmitting a handover response message to the another central unit.

In some embodiments, the method may further comprise: receiving a cell/carrier add request message for another UE transmitted by another central unit; in response to the cell/carrier add request message, transmitting a cell/carrier add request message for the another UE to a corresponding distributed unit; receiving a cell/carrier add response message transmitted by the corresponding distributed unit; and transmitting a cell/carrier add response message to the another central unit.

In some embodiments, the method may further comprise: after a connection is established between the another UE and the cell corresponding to the corresponding distributed unit, transmitting a path switch request message to the core network to inform the core network that the UE is handed over to the central unit; receiving a path switch response message transmitted by the core network.

According to some embodiments of the present disclosure, an apparatus for supporting movement of a UE in wireless communications is provided. The apparatus comprises: an RRC functional module, to transmit beam measurement configuration information to the UE; a beam information receiving module, to receive information of a candidate beam transmitted by a distributed unit, wherein the information of the candidate beam is obtained by the distributed unit based on a beam measurement result; the beam measurement result is obtained by the UE through measuring received beam signals based on the beam measurement configuration information.

In some embodiments, the RRC functional module transmits cell measurement configuration information to the UE; the apparatus further comprises: a cell information receiving module, to receive a cell measurement result obtained by the UE through measuring signals of an adjacent cell according to the cell measurement configuration information; a target cell determining module, to determine a candidate cell corresponding to the candidate beam to be a target cell according to the cell measurement result, and determine a distributed unit corresponding to the target cell as a target distributed unit.

In some embodiments, the cell measurement configuration and the beam measurement configuration information are carried in a measurement configuration message.

In some embodiments, the cell measurement result is transmitted in the beam measurement result to the distributed unit, and is forwarded to the apparatus by the distributed unit.

In some embodiments, the apparatus may further comprise: a bearer setup module, to transmit, if the apparatus is a central unit corresponding to the candidate distributed unit controlling the candidate beam, a bearer setup request message for the UE to the candidate distributed unit, receive a bearer setup response message transmitted by the candidate distributed unit; wherein the RRC functional module transmits an RRC reconfiguration message for accessing the target cell to the UE after the target cell is determined, and receives an RRC reconfiguration response message transmitted by the UE.

In some embodiments, the apparatus may further comprise: a target cell determining module, to directly determine the candidate beam as the target beam, determine the cell that the candidate beam belongs to as the target cell, and determine the distributed unit corresponding to the target cell as the target distributed unit.

In some embodiments, the apparatus may further comprise: a bearer setup module, to transmit, if the apparatus is a central unit corresponding to the target distributed unit, a bearer setup request message to the target distributed unit, and receive a bearer setup response message transmitted by the target distributed unit; wherein the RRC functional module transmits an RRC reconfiguration message for accessing the target cell to the UE, and receives an RRC reconfiguration response message transmitted by the UE.

In some embodiments, the apparatus may further comprise: a multi-connection determining module, to determine whether to configure multiple connections for the UE according to information of the candidate beam; a bearer setup module, to transmit, if the apparatus is a central unit corresponding to the target distributed unit and it is determined to configure multiple connections for the UE, a cell/carrier add request message for the UE to the target distributed unit, receive a cell/carrier add response message transmitted by the target distributed unit, wherein the RRC functional module transmits an RRC reconfiguration message for accessing the target cell to the UE, and receives an RRC reconfiguration response message transmitted by the UE.

In some embodiments, the connection manner of the multiple connections is relevant to a user plane functional split between the apparatus and the target distributed unit.

In some embodiments, the bearer setup request message comprises: a cell ID, a beam identifier and configurations corresponding to the bearer to be set up; wherein the configurations corresponding to the bearer is relevant to a user plane functional split between the apparatus and the target distributed unit.

In some embodiments, the apparatus may further comprise: an information deletion module, to transmit, after the connection between the UE and the target cell is established, a deletion message to the distributed unit to indicate the distributed unit to delete information of the UE, and to receive a deletion response message transmitted by the distributed unit.

In some embodiments, the apparatus may further comprise: a notifying module, to transmit, after the connection between the UE and the target cell is established, a message to the target distributed unit indicating that the connection between the UE and the target cell is established.

In some embodiments, the apparatus may further comprise: a handover module, to determine, if the apparatus is not the one corresponding to the candidate distributed unit controlling the candidate beam, a candidate central unit corresponding to the candidate distributed unit, transmit a handover request message for the UE to the candidate central unit, and receive a handover response message transmitted by the candidate central unit; wherein the RRC functional module transmits an RRC reconfiguration message for accessing the target cell to the UE after the target cell is determined, and receives an RRC reconfiguration response message transmitted by the UE; the candidate distributed unit and the candidate central unit are respectively the distributed unit and the central unit corresponding to the candidate beam.

In some embodiments, the apparatus may further comprise: a handover module, to determine, if the apparatus is not the one corresponding to the target distributed unit, a target central unit corresponding to the target distributed unit, transmit a handover request message for the UE to the target central unit, and receive a handover response message transmitted by the target central unit; wherein the RRC functional module transmits an RRC reconfiguration message for accessing the target cell to the UE, and receives an RRC reconfiguration response message transmitted by the UE.

In some embodiments, the apparatus may further comprise: a multi-connection determining module, to determine whether to configure multiple connections for the UE according to the information of the candidate beam; a handover module, to determine, if the apparatus is not the one corresponding to the target distributed unit and it is determined to configure multiple connections, a target central unit corresponding to the target distributed unit, transmit a cell/carrier add request message for the UE to the target central unit, and receive a cell/carrier add response message transmitted by the target central unit; wherein the RRC functional module transmits an RRC reconfiguration message for accessing the target cell to the UE, and receives an RRC reconfiguration response message transmitted by the UE.

In some embodiments, the connection manner of the multiple connections is relevant to a user plane functional split between the target central unit and the target distributed unit.

In some embodiments, the apparatus may further comprise: a handover notifying module, to transmit, after the connection between the UE and the target cell is established, a path switch request message to the core network to notify the core network that the UE is handed over to the target central unit; and to receive a path switch response message transmitted by the core network.

In some embodiments, the apparatus may further comprise: an information deleting module, to receive, after the connection between the UE and the target cell is established, a deletion message transmitted by the target central unit indicating to delete information of the UE, delete the information of the UE in response to the deletion message and transmit a deletion message to the distributed unit to indicate the distributed unit to delete the information of the UE, receive a deletion response message transmitted by the distributed unit and transmit a deletion response message to the target central unit.

In some embodiments, the bearer setup request message comprises: a cell ID, a bearer identifier, and configurations corresponding to the bearer to be set up; wherein the configurations corresponding to the bearer is relevant to a user plane functional split between the target central unit and the target distributed unit.

In some embodiments, the apparatus may further comprise: a beam information transmitting unit, to transmit beam measurement configuration information to the distributed unit.

In some embodiments, the apparatus may further comprise: a handover module, to receive a handover request message for another UE transmitted by another central unit, in response to the handover request, transmit a bearer setup request message for the another UE to a corresponding distributed unit, receive a bearer setup response message transmitted by the corresponding distributed unit, and transmit a handover response message to the another central unit.

In some embodiments, the apparatus may further comprise: a handover module, to receive a cell/carrier add request message for another UE transmitted by another central unit, in response to the cell/carrier add request message, transmit a cell/carrier add request message for the another UE to a corresponding distributed unit, receive a cell/carrier add response message transmitted by the corresponding distributed unit, and transmit a cell/carrier add response message to the another central unit.

In some embodiments, the apparatus may further comprise: a handover notifying module, to transmit, after the connection between the another UE and the cell corresponding to the corresponding distributed unit is established, a path switch request message to the core network to notify the core network that the UE is handed over to the central unit, and receive a path switch response message transmitted by the core network.

According to some embodiments of the present disclosure, a method for supporting movement of a UE in wireless communications is provided. The method comprises: a distributed unit configuring resources for a UE for beam measurement reporting, receiving a beam measurement result reported by the UE; wherein the beam measurement result is obtained by the UE through measuring beam signals according to beam measurement configuration information transmitted by a central unit; and reporting information of a candidate beam to the central unit according to the beam measurement result.

In some embodiments, the method may further comprise: if the distributed unit is the one controlling the candidate beam, directly determining the candidate beam as a target beam, and performing data transmission with the UE via the target beam.

In some embodiments, a cell measurement result is carried in the beam measurement result; the method further comprises: forwarding the cell measurement result to the central unit, wherein the cell measurement result and the information of the candidate beam are carried in the same message.

In some embodiments, the method may further comprise: receiving a deletion message indicating to delete information of the UE transmitted by the central unit; and deleting the information of the UE and transmitting a deletion response message to the central unit in response to the deletion message.

In some embodiments, the method may further comprise: receiving beam measurement configuration information transmitted by the central unit; and saving the beam measurement configuration information in UE context.

According to some embodiments of the present disclosure, an apparatus for supporting movement of a UE in wireless communications is provided. The apparatus comprises: a resource configuring module, to configure resources for a UE for beam measurement reporting; a beam information receiving module, to receive a beam measurement result reported by the UE; wherein the beam measurement result is obtained by the UE through measuring beam signals according to beam measurement configuration information transmitted by a central unit; and a beam information transmitting module, to report information of a candidate beam to the central unit according to the beam measurement result.

In some embodiments, the apparatus may further comprise: if the apparatus is a distributed unit controlling the candidate beam, the apparatus directly determines the candidate beam as a target beam, and performs data transmission with the UE via the target beam.

In some embodiments, the cell measurement result is carried in the beam measurement result; wherein the beam information transmitting module forwards the cell measurement result to the central unit, wherein the cell measurement result and the information of the candidate beam is carried in the same message.

In some embodiments, the apparatus may further comprise: an information deleting module, to receive a deletion message transmitted by the central unit indicating the distributed unit to delete information of the UE, delete the information of the UE and transmit a deletion response message to the central unit in response to the deletion message.

In some embodiments, the apparatus may further comprise: a beam configuration receiving module, to receive beam measurement configuration information transmitted by the central unit; and a beam configuration saving module, to save the beam measurement configuration information in UE context.

According to the method and apparatus for supporting movement of the UE provided by the embodiments of the present disclosure, it is possible to support movement of the UE, establish multiple bearers for the UE and implement network resource sharing. Further, resource scheduling is more flexible.

In the following description of the present disclosure, other aspects and/or merits of the main idea of the present disclosure will be described in detail hereinafter with reference to accompanying drawings and embodiments to make the technical solution and merits therein clearer.

BRIEF DESCRIPTION OF DRAWINGS

Hereinafter the drawings of the embodiments of the present disclosure are briefly described to make the above and other features of the embodiments of the present disclosure clearer, in which, FIG. 1 shows functional split between the CU and the DU according to some embodiments of the present disclosure;

FIG. 2 is a flowchart illustrating a method for supporting movement of a UE by a base station in wireless communications according to some embodiments of the present disclosure;

FIG. 3 is a flowchart illustrating a method for supporting movement of a UE by a base station in wireless communications according to a first embodiment of the present disclosure;

FIG. 4 is a flowchart illustrating a method for supporting movement of a UE by a base station in wireless communications according to a second embodiment of the present disclosure;

FIG. 5 is a flowchart illustrating a method for supporting movement of a UE by a CU in wireless communications according to some embodiments of the present disclosure;

FIG. 6 is a flowchart illustrating a method for supporting movement of a UE by a DU in wireless communications according to some embodiments of the present disclosure;

FIG. 7 is a schematic diagram illustrating a structure of a base station for supporting movement of a UE in wireless communications according to some embodiments of the present disclosure;

FIG. 8 is a schematic diagram illustrating a structure of a CU for supporting movement of a UE according to some embodiments of the present disclosure; and FIG. 9 is a schematic diagram illustrating a structure of a DU for supporting movement of a UE according to some embodiments of the present disclosure.

MODE FOR THE INVENTION

FIGS. 1 through 9, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

In the 5G architecture, with the development requirement of wireless technologies, functional modules which originally implemented in the same base station are split. Some functional modules are more and more close to users, whereas others are pool formatted, virtualized and centralized deployed. In other words, the base station may be split into two parts, one is a central unit (CU) and another is a distributed unit (DU). The DU is closer to users, and the CU is far away from antennas and can support multi-antenna connections and improve network performance. One CU may be connected with multiple DUs. The functions on the CU may be virtualized. The CU and the DU are connected via a fronthaul connection. The fronthaul connection is mainly a connection between the DU and the CU.

There may various manners to split the functions between the CU and the DU. FIG. 1 shows an example for splitting the functions between the CU and the DU according to some embodiments of the present disclosure. As shown in FIG. 1, four split manners between the CU and the DU are shown. For example, radio resource control (RRC) function is implemented on the CU (not shown), packet data convergence protocol and radio link control (RLC) functions of the user plane are implemented on the CU, media access control (MAC) and physical layer (PHY) are implemented on the DU. Alternatively, the RRC function is implemented on the CU (not shown), the PDCP function and some RLC functions are implemented on the CU, and the other RLC function, the MAC and the PHY are implemented on the DU. In conclusion, at present there are various kinds of functional split manners. In the future, one or more functional split manner may be selected.

FIG. 2 is a flowchart illustrating a method for supporting movement of a UE by a base station in wireless communications according to some embodiments of the present disclosure. Herein, the base station includes a central unit and at least one distributed unit. The central unit implements functions of a control plane and some functions of a user plane, and the at least one distributed unit implements the other functions of the user plane.

As shown in FIG. 2, in step 201, the central unit transmits beam measurement configuration information to a UE. Herein, the central unit is the one currently serving the UE, i.e., the UE is currently within the coverage of the central unit.

In step 202, the distributed unit configures resources for the UE for beam measurement reporting. Herein, the distributed unit is the one that is currently serving the UE, i.e., the UE is currently within the coverage of the distributed unit.

In step 203, the UE measures received beam signals according to the beam measurement configuration information, and reports a beam measurement result to the distributed unit on the configured resources.

In step 204, the distributed unit determines a candidate beam usable for the UE according to the beam measurement result, and reports information about the candidate beam to the central unit. In other words, the source distributed unit selects a beam with better signal quality as the candidate beam according to the beam measurement result.

In the following steps, the candidate beam may be directly taken as a target beam. The central unit may also determine whether to take the candidate beam as the target beam according to a received cell measurement result.

Herein, the cell measurement result may be an RRC message transmitted by the UE directly to the central unit, or may be an object about the cell measurement result forwarded by the distributed unit, such as an RRC container, or may be indication information of the cell measurement result.

In some embodiments, if the distributed unit is the one controlling at least one of candidate beams, the distributed unit directly determines the candidate beam as the target beam and performs data transmission with the UE via the target beam.

In other embodiments, if at least one of the candidate beams is controlled by a candidate distributed unit different from the present distributed unit, the central unit needs to be involved. The central unit determines a central unit corresponding to the candidate distributed unit. If the candidate distributed unit corresponds to the present central unit, i.e., the UE moves between different distributed units of the same central unit, the method may proceed with the following first embodiment as shown in FIG. 3. If the candidate distributed unit corresponds to a central unit different from the present central unit, i.e., the UE moves between distributed units of different central units, the method may proceed with the second embodiment as shown in FIG. 4.

Hereinafter, the method for supporting the movement of the UE is described in detail with reference to FIGS. 3 and 4. It should be understood that, the following detailed implementation is not restricted to the following first and second embodiments, but may be applied in other embodiments of the present disclosure.

FIG. 3 is a flowchart illustrating a method for supporting movement of a UE in wireless communications according to a first embodiment of the present disclosure.

Herein, the DU and the CU are connected via a fronthaul interface. Some functions of an access network are implemented on the DU. On the control plane, RRC functions are implemented on the CU. On the user plane, functions of the access network are split into two parts and are respectively implemented on the CU and the DU. Suppose that at least the functions of the physical layer are implemented on the DU, and other functions of the user plane may be implemented on the DU or on the CU. The DU and the CU exchange information via a newly defined interface protocol. Assume that the newly defined interface protocol is referred to as X protocol, the X protocol may include a control plane and a user plane. In 5G, multiple antennas may transmit data to the UE via one beam. Along with the movement of the UE, signals may be switched to another beam to be transmitted to the UE. The beam switching is a physical layer procedure. When the UE moves within one DU, merely beam switching is performed. The beam switching includes adding a beam, deleting a beam and replacing a beam. This procedure happens between merely the DU and the UE without involvement of the CU. If the UE moves to another DU, the CU needs to be involved. In this embodiment of the present disclosure, a method for supporting movement of the UE by the base station in the case that the UE moves between different DUs of the same CU is described.

In step 301, the CU transmits a measurement configuration message to the UE, wherein the measurement configuration message carries beam measurement configuration information.

The measurement configuration message is an RRC message transmitted by an RRC functional module of the CU. The measurement configuration message includes the beam measurement configuration information for the UE, and may further include cell measurement configuration information, e.g., the carrier to be measured. In some embodiments, the measurement configuration information may further include configuration information for beam measurement reporting, e.g., threshold information and periodicity information for beam measurement reporting, etc. In addition, the measurement configuration information may further include configuration information for cell measurement reporting, e.g., threshold information and periodicity information for cell measurement reporting, etc.

After receiving the measurement configuration message, the UE measures the received beam signals according to the beam measurement configuration information.

If the measurement configuration message further includes the cell measurement configuration information, signals of an adjacent cell are also measured according to the cell measurement configuration information. The cell measurement signals and the beam measurement signals may be different signals.

In some embodiments, the CU may also transmit the beam measurement configuration information configured for the UE to the DU via the X interface. The DU saves the information in UE context. The DU may perform a later physical layer beam measurement procedure utilizing this information.

In step 302, the DU configures resources for beam measurement reporting for the UE.

A physical layer module of the DU transmits downlink physical layer signals to configure the resources for beam measurement reporting for the UE. The beam measurement report is transmitted to the DU by the UE. Therefore, uplink resources need to be configured. On such resources, the UE transmits a beam measurement result to the DU.

In step 303, the UE reports a beam measurement result on the corresponding resources.

The UE measures a signal quality of the beam and reports the measurement result of the beam to the DU on the corresponding uplink resources according to the configured threshold or periodically. The beam measurement result reported by the UE may include an identifier of the beam and the signal quality of the beam. The identifier of the beam uniquely identifies a beam within the DC controlling the beam or within the whole network. If the identifier is unique in the whole network, cell information may be contained in the identifier of the beam. As such, a cell that the beam belongs to may be determined according to the identifier of the beam. For example, several bits in the identifier of the beam may be used for identifying a corresponding DU or cell. Alternatively, the identifier of the beam does not contain cell information but contain information of the corresponding DU. The DU may find the corresponding cell according to the identifier of the beam. The signal quality of the beam represents the strength of the signals. The beam measurement result reported by the UE may include information about multiple beams. For example, the beam measurement result includes information of beam 1 and beam 3. If the UE reports information of multiple beams, the multiple beams may be arranged according to their signal qualities, i.e., the beam with the best signal quality may be arranged in the first.

In some embodiments, the UE may report a cell measurement result at the same time. In step 301, the UE may obtain a measurement object and report configuration for measuring a serving cell and an adjacent cell. The measurement object may be the carrier of the adjacent cell. The report configuration may include reporting periodically or reporting under event triggers.

There may be various manners for reporting the cell measurement result. For example, the physical layer of the UE measures that the beam quality exceeds a predefined threshold, the physical layer of the UE reports it to the RRC layer. Before or after step 303, the UE transmits an RRC message to the CU carrying the cell measurement report of the adjacent cell.

Alternatively, the RRC message about the cell measurement result may be carried in a message transmitted in step 303. The message transmitted in step 303 may include an RRC transparent container. After receiving the RRC transparent container, the DU forwards the RRC transparent container to the CU.

Alternatively, when the physical layer of the UE reports the beam measurement result to the DU in step 303, indication information may be added, indicating that the cell that the beam belongs to also meet a threshold for cell handover measurement reporting.

The physical layer of the DU receives the message reporting the beam measurement result transmitted in step 303. If the message carries an RRC transparent container, the DU forwards the RRC transparent container to the CU when transmitting the message in step 305. Or, the DU knows according to the indication information carried in the message transmitted in step 303 that, the cell that the beam belongs to may act as a handover target cell, the DU carries the indication information when transmitting the message in step 305. If the UE reports multiple beams and the beams belong to different cells, the multiple beams may be arranged according to their signal qualities, i.e., the beam with the best signal quality may be arranged in the first. As such, the cells are also arranged according to their signal qualities. Or, the information reported by the UE includes a list of cells meeting a handover condition. If there are multiple cells meeting the handover condition, the information reported by the UE includes identifiers of the multiple cells, the cells are arranged according to their signal qualities, i.e., the cell with the best signal quality is arranged in the first.

In step 304, the DU selects to transmit data of the UE using one or more beams.

The DU selects to transmit data on a beam with a better quality according to the beam quality report. For example, beam 1 has a better quality and beam 1 belongs to the current DU (i.e., the UE moves within the same DU), the DU may directly determine to transmit data of the UE on beam 1. In other words, this procedure may be performed between merely the DU and the UE without involvement of the CU.

The DU (i.e., source DU, hereinafter referred to source DU) knows according to the beam identifier that another beam, e.g., beam 3 belongs to another DU and the quality of beam 3 also reaches a particular threshold and meets the quality requirement of data transmission, the UE is very likely to move to the coverage area of a DU that beam 3 belongs to. Since the beam is under the control of another DU (i.e., target DU, hereinafter referred to as target DU), the source DU performs the step 305. That is, the UE moves between different DUs under the same CU.

In step 305, the source DU transmits a beam measurement report to the CU.

Since beam 3 belongs to another DU, if the UE moves to the coverage area of the DU that beam 3 belongs to, the CU needs to configure a protocol layer on the target DU for the UE. Therefore, the source DU transmits a message to the CU, indicating that the UE may move to the target DU and informing the CU to make preparation. The beam measurement report message carries information of the beam. The information of the beam includes beam identifier, and may further include identifier of a target cell and/or an identifier of the target DU, or may further include the signal quality of the target beam. The message may carry information of multiple beams. If the message carries information of multiple beams, the beams may be arranged according to their signal qualities, i.e. the beam with the best signal quality is arranged in the first.

According to the information reported by the UE in step 303, the message reported in step 305 may further carry indication information indicating that cell handover condition is met or a cell identifier list. The message reported in step 305 carries beam information, which may further include indication information indicating that the cell that the beam belongs to also meets the threshold for cell handover measurement reporting. If the UE reports multiple beams and the beams belong to different cells, the beams may be arranged according to their signal qualities, i.e., the beam with the best signal quality may be arranged in the first. As such, the cells may also be arranged according to their signal qualities. Alternatively, the message reported in step 305 may further carries a cell identifier list of cells meeting the handover condition. The cells may be arranged according to their signal qualities.

After receiving the message reported by the source DU, the CU may adopt one of the following methods:

Method 1: Handover after Cell Measurement

In method 1, the CU obtains the quality report of one or some beams of the target DU, the beam quality is higher than a particular threshold, but the CU has not obtained the measurement report of the target cell yet. In order to reduce handover delay, the CU may configure a UE protocol stack on the target DU and then continue to monitor the adjacent cell measurement report transmitted by the UE. If receiving the cell measurement result reported by the UE and the target cell meets the handover condition, the CU transmits an RRC message to the UE to perform handover. The detailed procedure is as follows:

In step 308, the CU transmits a bearer setup request message to the target DU.

The bearer setup request message carries a cell identifier, a beam identifier and configurations corresponding to the bearer to be set up. The configurations corresponding to the bearer are relevant to user plane functional split between the CU and the target DU. For example, if the target DU has RLC and MAC functions, the configurations corresponding to the bearer include configuration information for the RLC and the MAC.

The bearer setup request message includes beam information, such as beam identifier, beam quality, etc. According to the beam information, the target DU is able to know that the signal quality of the beam meets a particular threshold and has a better quality and should perform data transmission with the UE on this beam. After receiving uplink access signals of the UE, the target DU may configure the beam to the UE for data transmission. As such, data interrupt time caused by the handover may be reduced.

In step 309, the target DU transmits a bearer setup response to the CU.

The target DU allocates corresponding resources according to the bearer configuration information and transmits a bearer setup response to the CU. The response message carries allocation information for the UE, e.g., random access resources allocated for the UE by the target DU.

In some embodiments, in step 306, the CU configures the UE to measure an adjacent cell. If the CU has configured the UE to measure the adjacent cell before (e.g., the CU has transmitted the cell measurement configuration information to the UE in step 301), this step may be omitted.

In step 307, the UE transmits a cell measurement report to the CU.

The UE measures the adjacent cell and reports a cell meeting a handover condition to the CU via a cell measurement report message. The cell measurement report includes information of the cell meeting the handover condition.

In some embodiments, steps 306 and 307 may also be performed before step 308. The CU receives the message transmitted in step 305 and knows according to the message that a beam belonging to another DU has a higher quality. The source CU configures the UE to perform cell measurement. If the UE has been configured to measure this cell before, step 306 is omitted. The CU receives the cell measurement report transmitted by the UE and determines to perform a cell handover according to of the cell measurement report and radio resource management information.

In step 310, the CU determines to hand over the UE to the cell where the target DU belongs to, the CU transmits an RRC reconfiguration message to the UE, requesting the UE to perform handover.

The CU determines to hand over the UE according to the measurement report and the radio resource management information. The CU generates an RRC reconfiguration message according to parameters required for accessing the target cell during handover and transmits the RRC reconfiguration message to the UE to perform handover. The RRC reconfiguration message mainly includes a cell ID, carrier frequency, target power, and other radio resources and physical resource configurations.

In step 311, the UE transmits an RRC reconfiguration response message to the CU.

The UE completes uplink synchronization with the target cell. After receiving the RRC reconfiguration message containing a handover command, the UE disconnects with the source cell and establishes a new radio connection with the target cell. During this time period, the data transmission is interrupted. The establishing of the new radio connection with the target cell includes steps such as downlink synchronization establishment, timing advance, and data transmission. After successfully accessing the target cell, the UE transmits an RRC reconfiguration complete message to the target cell indicating that the handover is completed for the UE.

In step 312, the CU transmits a message to the target DU to notify the target DU to start data reception and transmission. The target DU may also know that the UE has handed over to the cell of the target DU and starts data reception and transmission after receiving data of the UE via the user plane or after performing the synchronization procedure with the UE. Thus, step 312 may be omitted.

Step 313, data transmission is started in the target cell.

During the handover procedure, if target beam is also configured, the data is transmitted using the corresponding beam of the target cell. For example, beam 3 is configured in the handover message. After the handover, the data is transmitted using beam 3.

In step 314, the CU transmits a message to the source DU to delete information of the UE on the source DU, including all information of the UE such as UE context, UE protocol stack, bearer, etc.

In step 315, the source DU transmits a deletion response message to the CU.

Method 2: Direct Handover

In method 2, the CU obtains information of one or some beams of the target DU, e.g., beam identifier, beam quality report, the beam quality is higher than a particular threshold, the beam quality report also reflects the signal quality of the cell, if the beam quality reaches a particular threshold, the CU may determine to perform cell handover. Or, the CU obtains not only the beam information of the target DU, but also the measurement report of the target cell, e.g., the CU obtains the RRC transparent container, the RRC transparent container includes measurement report of an adjacent cell, or the CU obtains indication information indicating that the target cell meets a handover condition. The CU may determine to perform cell handover. The procedure is as follows:

Step 308, the CU transmits a bearer setup request to the target DU.

The bearer setup request message carries a cell identifier, a beam identifier and configurations corresponding to the bearer to be set up. The configurations corresponding to the bearer are relevant to user plane functional split between the CU and the target DU. For example, if the target DU has RLC and MAC functions, the configurations corresponding to the bearer include configuration information for the RLC and the MAC.

The bearer setup request message includes beam information, such as beam identifier, beam quality, etc. According to the beam information, the target DU is able to know that the signal quality of the beam meets a particular threshold and has a better quality and should perform data transmission with the UE on this beam. After receiving uplink access signals of the UE, the target DU may configure the beam to the UE for data transmission. As such, data interrupt time caused by the handover may be reduced.

In step 309, the target DU transmits a bearer setup response to the CU.

The target DU allocates corresponding resources according to the bearer configuration information and transmits a bearer setup response to the CU. The response message carries allocation information for the UE, e.g., random access resources allocated for the UE by the target DU.

In step 310, the CU transmits an RRC reconfiguration message to the UE, requesting the UE to perform handover.

The CU determines to hand over the UE according to the measurement report and the radio resource management information. The CU generates an RRC reconfiguration message according to parameters required for accessing the target cell during handover and transmits the RRC reconfiguration message to the UE to perform handover. The RRC reconfiguration message mainly includes a cell ID, carrier frequency, target power, and other radio resources and physical resource configurations.

In step 311, the UE transmits an RRC reconfiguration response message to the CU.

The UE completes uplink synchronization with the target cell. After receiving the RRC reconfiguration message containing a handover command, the UE disconnects with the source cell and establishes a new radio connection with the target cell. During this time period, the data transmission is interrupted. The establishing of the new radio connection with the target cell includes steps such as downlink synchronization establishment, timing advance, and data transmission. After successfully accessing the target cell, the UE transmits an RRC reconfiguration complete message to the target cell indicating that the handover is completed for the UE.

In step 312, the CU transmits a message to the target DU to notify the target DU to start data reception and transmission. The target DU may also know that the UE has handed over to the cell of the target DU and starts data reception and transmission after receiving data of the UE via the user plane or after performing the synchronization procedure with the UE. Thus, step 312 may be omitted.

Step 313, data transmission is started in the target cell.

During the handover procedure, if target beam is also configured, the data is transmitted using the corresponding beam of the target cell. For example, beam 3 is configured in the handover message. After the handover, the data is transmitted using beam 3.

In step 314, the CU transmits a message to the source DU to delete information of the UE on the source DU, including all information of the UE such as UE context, UE protocol stack, bearer, etc.

In step 315, the source DU transmits a deletion response message to the CU.

Method 3, Configuring Multiple Connections, e.g., DC or CA

In method 3, the CU obtains information of one or some beams of the target DU, e.g., beam identifier, beam quality report, the beam quality is higher than a particular threshold, the beam quality report also reflects the signal quality of the cell, if the beam quality reaches a particular threshold, the CU determines to configure multiple connections for the UE. According to the user plane functional split manner between the CU and the target DU, there may be various configuration manners for the multiple connections, e.g., double connections (DC), or carrier aggregation (CA). The detailed procedure is as follows:

In step 308, the CU transmits a cell/carrier add message to the target DU.

The cell/carrier add message carries information required for establishing multiple connections, including cell identifier, beam identifier, configurations corresponding to the bearer to be set up. The configurations corresponding to the bearer are relevant to the user plane functional split between the CU and the target DU, e.g. if the target DU has the RLC and the MAC functions, the configurations corresponding to the bearer include configuration information about the RLC and the MAC.

The cell/carrier add message contains beam information, e.g., beam identifier, beam quality, etc. According to the beam information, the target DU knows that the signal quality of the beam meets a particular threshold and has a better quality and should transmit data to the UE on the beam. After receiving uplink access signals of the UE, the target DU configures the beam to the UE for data transmission. Thus, the data interruption duration caused by the handover may be reduced.

In step 309, the target DU transmits a cell/carrier add response to the CU.

The target DU allocates corresponding resources according to the bearer configuration information and transmits a bearer setup response to the CU. The response message carries allocation information for the UE, e.g., random access resources allocated for the UE by the target DU.

In step 310, the CU transmits an RRC reconfiguration message to the UE, requesting the UE to perform handover.

The CU determines to hand over the UE according to the measurement report and the radio resource management information. The CU generates an RRC reconfiguration message according to parameters required for accessing the target cell during handover and transmits the RRC reconfiguration message to the UE to perform handover. The RRC reconfiguration message mainly includes a cell ID, carrier frequency, target power, and other radio resources and physical resource configurations.

In step 311, the UE transmits an RRC reconfiguration response message to the CU.

The UE completes uplink synchronization with the target cell. After receiving the RRC reconfiguration message containing a handover command, the UE establishes a new radio connection with the target cell. The establishing of the new radio connection with the target cell includes steps such as downlink synchronization establishment, timing advance, and data transmission. After successfully accessing the target cell, the UE transmits an RRC reconfiguration complete message to the target cell indicating that the bearer reconfiguration is completed for the UE.

In step 312, the CU transmits a message to the target DU to notify the target DU to start data reception and transmission. The target DU may also know that the UE has handed over to the cell of the target DU and starts data reception and transmission after receiving data of the UE via the user plane or after performing the synchronization procedure with the UE. Thus, step 312 may be omitted.

In step 313, data transmission is started in the target cell. During the bearer reconfiguration procedure, if a target beam is also configured, the data is transmitted on the corresponding beam of the target cell. For example, if beam 3 is configured in the bearer reconfiguration message, after the multiple connections are established, the data is transmitted on beam 1 of the source DU and beam 3 of the target DU.

It should be noted that, in method 3, the UE information on the source DU needs not be deleted.

FIG. 4 is a flowchart illustrating a method for supporting movement of a UE by a base station in wireless communications according to a second embodiment of the present disclosure.

Herein, the DU and the CU are connected via a fronthaul interface. Some functions of an access network are implemented on the DU. On the control plane, the functions of the RRC are implemented on the CU. On the user plane, functions of the access network are split into two parts and are respectively implemented on the CU and the DU. Suppose that at least the functions of the physical layer are implemented on the DU, other functions of the user plane may be implemented on the DU or on the CU. The DU and the CU exchange information via a newly defined interface protocol. Assume that the newly defined interface protocol is referred to as X protocol, the X protocol may include a control plane and a user plane. In 5G, multiple antennas may transmit data to the UE via one beam. Along with the movement of the UE, signals may be switched to another beam to be transmitted to the UE. The beam switching is a physical layer procedure. When the UE moves within one DU, merely beam switching is performed. The beam switching includes adding a beam, deleting a beam and replacing a beam. This procedure happens between merely the DU and the UE without involvement of the CU. If the UE moves to another DU, the CU needs to be involved. In this embodiment of the present disclosure, a method for supporting movement of the UE by the base station in the case that the UE moves between different CUs is described.

In step 401, the CU transmits a measurement configuration message to the UE, wherein the measurement configuration message carries beam measurement configuration information.

The measurement configuration message is an RRC message transmitted by an RRC functional module of the CU. The measurement configuration message includes the beam measurement configuration information for the UE, and may further include cell measurement configuration information, e.g., the carrier to be measured. In some embodiments, the measurement configuration information may further include configuration information for beam measurement reporting, e.g., threshold information and periodicity information for beam measurement reporting, etc. In addition, the measurement configuration information may further include configuration information for cell measurement reporting, e.g., threshold information and periodicity information for cell measurement reporting, etc.

After receiving the measurement configuration message, the UE measures the received beam signals according to the beam measurement configuration information.

If the measurement configuration message further includes the cell measurement configuration information, signals of adjacent cells are also measured according to the cell measurement configuration information. The cell measurement signals and the beam measurement signals may be different signals.

In some embodiments, the CU may also transmit the beam measurement configuration information configured for the UE to the DU via the X interface. The DU saves the information in UE context. The DU may perform later physical layer beam measurement procedure utilizing this information.

In step 402, the DU configures resources for beam measurement reporting for the UE.

A physical layer module of the DU transmits downlink physical layer signals to configure the resources for beam measurement reporting for the UE. The beam measurement report is transmitted to the DU by the UE. Therefore, uplink resources need to be configured. On such resources, the UE transmits a beam measurement result to the DU.

In step 403, the UE reports the beam measurement result on the corresponding resources.

The UE measures a signal quality of the beam and reports the measurement result of the beam to the DU on the corresponding uplink resources according to the configured threshold or periodically. The beam measurement result reported by the UE may include an identifier of the beam and the signal quality of the beam. The identifier of the beam uniquely identifies a beam within the DC controlling the beam or within the whole network. If the identifier is unique in the whole network, cell information may be contained in the identifier of the beam. As such, a cell that the beam belongs to may be determined according to the identifier of the beam. For example, several bits in the identifier of the beam may be used for identifying a corresponding DU or cell. Alternatively, the identifier of the beam does not contain cell information but contain information of the corresponding DU. The DU may find the corresponding cell according to the identifier of the beam. The signal quality of the beam represents the strength of the signals. The beam measurement result reported by the UE may include information about multiple beams. For example, the beam measurement result includes information of beam 1 and beam 3. If the UE reports information of multiple beams, the multiple beams may be arranged according to their signal qualities, i.e., the beam with the best signal quality may be arranged in the first.

In some embodiments, the UE may report a cell measurement result at the same time. In step 401, the UE may obtain a measurement object and report configuration for measuring a serving cell and an adjacent cell. The measurement object may be the carrier of the adjacent cell. The report configuration may include reporting periodically or reporting under event triggers.

There may be various manners for reporting the cell measurement result. For example, the physical layer of the UE measures that the beam quality exceeds a predefined threshold, the physical layer of the UE reports it to the RRC layer. Before or after step 403, the UE transmits an RRC message to the CU carrying the cell measurement report of the adjacent cell.

Alternatively, the RRC message about the cell measurement result may be carried in a message transmitted in step 403. The message transmitted in step 403 may include an RRC transparent container. After receiving the RRC transparent container, the DU forwards the RRC transparent container to the CU.

Alternatively, when the physical layer of the UE reports the beam measurement result to the DU in step 403, indication information may be added, indicating that the cell that the beam belongs to also meet a threshold for cell handover measurement report.

The physical layer of the DU receives the message reporting the beam measurement result transmitted in step 403. If the message carries an RRC transparent container, the DU forwards the RRC transparent container to the CU when transmitting the message in step 405. Or, the DU knows according to the indication information carried in the message transmitted in step 303 that, the cell that the beam belongs to may act as a handover target cell, the DU carries the indication information when transmitting the message in step 405. If the UE reports multiple beams and the beams belong to different cells, the multiple beams may be arranged according to their signal qualities, i.e., the beam with the best signal quality may be arranged in the first. As such, the cells are also arranged according to their signal qualities. Or, the information reported by the UE includes a list of cells meeting a handover condition. If there are multiple cells meeting the handover condition, the information reported by the UE includes identifiers of the multiple cells, the cells are arranged according to their signal qualities, i.e., the cell with the best signal quality is arranged in the first.

In step 404, the DU selects to transmit data of the UE using one or more beams.

The DU selects to transmit data on a beam with a better quality according to the beam quality report. For example, beam 1 has a better quality and beam 1 belongs to the current DU (i.e., the UE moves within the same DU), the DU may directly determine to transmit data of the UE on beam 1. In other words, this procedure may be performed between merely the DU and the UE without involvement of the CU.

The DU (i.e., source DU, hereinafter referred to source DU) knows according to the beam identifier that another beam, e.g., beam 3 belongs to another DU and the quality of beam 3 also reaches a particular threshold and meets the quality requirement of data transmission, the UE is very likely to move to the coverage area of a DU that beam 3 belongs to. Since the beam is under the control of another DU (i.e., target DU, hereinafter referred to as target DU), and the target DU does not correspond to the present CU (i.e. source CU, hereinafter referred to as source CU), the target DU corresponds to another CU (i.e., target CU, hereinafter referred to as target CU). The source DU performs step 405. In other words, the UE moves between different CUs.

In step 405, the source DU transmits a beam measurement report to the source CU.

Since beam 3 belongs to another DU, if the UE moves to the coverage area of the DU that beam 3 belongs to, the source CU needs to configure a protocol layer on the target DU for the UE. Therefore, the source DU transmits a message to the source CU, indicating that the UE may move to the target DU and informing the source CU to make preparation. The beam measurement report message carries information of the beam. The information of the beam includes beam identifier, and may further include identifier of a target cell and/or an identifier of the target DU, or may further include the signal quality of the target beam. The message may carry information of multiple beams. If the message carries information of multiple beams, the beams may be arranged according to their signal qualities, i.e. the beam with the best signal quality is arranged in the first.

According to the information reported by the UE in step 403, the message reported in step 405 may further carry indication information indicating that cell handover condition is met or a cell identifier list. The message reported in step 405 carries beam information, which may further include indication information indicating that the cell that the beam belongs to also meets the threshold for cell handover measurement reporting. If the UE reports multiple beams and the beams belong to different cells, the beams may be arranged according to their signal qualities, i.e., the beam with the best signal quality may be arranged in the first. As such, the cells may also be arranged according to their signal qualities. Alternatively, the message reported in step 405 may further carries a cell identifier list of cells meeting the handover condition. The cells may be arranged according to their signal qualities.

After receiving the message reported by the source DU, the source CU may adopt one of the following methods:

Method 1: Handover after Cell Measurement

In method 1, the source CU obtains the quality report of one or more beams of the target DU, the beam quality is higher than a particular threshold, the source CU does not obtain the measurement report of the target cell yet. In order to reduce handover delay, the source CU may configure protocol stack for the UE on the target DU and then continue to monitor the measurement report of the adjacent cell transmitted by the UE. If receiving the cell measurement report transmitted by the UE and the target cell meets the handover condition, the CU transmits an RRC message to the UE to perform the handover. The detailed procedure is as follows:

In step 408, the source CU transmits a handover request message to the target CU.

The handover request message carries information necessary for the handover, e.g. handover reason, target cell ID, UE context information, SAE bearer ID, SAE bearer QoS parameters, RRC context information, etc. The target cell performs resource admit and allocates radio resources and service bearer resources for the UE.

In step 409, the target CU transmits a bearer setup request to the target DU.

The bearer setup request includes a cell identifier, a beam identifier and configurations corresponding to the bearer to be set up. The configurations corresponding to the bearer are relevant to the user plane functional split between the target CU and the target DU. For example, if the target DU has the RLC and MAC functions, the configurations corresponding to the bearer include configuration information for the RLC and MAC.

The bearer setup request includes the beam information, e.g., bean identifier, beam quality, etc. According to the beam information, the target DU knows that the signal quality of the beam meets a particular threshold and has a better quality and should transmit data to the UE on the beam. After receiving uplink access signals of the UE, the target DU may configure to transmit data to the UE on the beam, so as to reduce data interruption time cause by the handover.

In step 410, the target DU transmits a bearer setup response to the target CU.

The target DU allocates corresponding resources according to the bearer configuration information and transmits a response message to the target CU. The response message includes information about the allocation for the UE, e.g., random access resources allocated to the UE by the target DU.

In step 411, the target CU transmits a handover response to the source CU.

In some embodiments, in step 406, the source CU configures the UE to measure adjacent cells. If the source CU has configured the UE to measure the adjacent cells before (e.g., the CU has transmitted cell measurement configuration information to the UE in step 401), this step may be omitted.

In step 407, the UE transmits a cell measurement report to the source CU.

The UE measures the adjacent cells and reports a cell meeting a handover condition to the source CU via a cell measurement report. The cell measurement report includes information of the cell meeting the handover condition.

In some embodiments, before step 408, the source CU receives the message transmitted in step 405. According to this message, the source CU knows that the beam of the target DU belongs to another CU and the quality of the beam is high, therefore the cell quality of the cell that the beam belongs to should also meet the handover condition. Therefore, the source CU may firstly initiate the handover procedure, and configures the UE to perform cell measurement at the same time.

In some embodiments, steps 406 and 407 may also be performed before step 408. The source CU receives the message transmitted in step 405 and knows according to this message that the beam of the target DU belongs to another CU, and the quality of the beam is high, the source CU configures the UE to perform cell measurement. If measurement of the cell has been configured, step 406 may be omitted. The source CU receives the cell measurement report transmitted by the UE and determines to perform cell handover according to cell measurement report and radio resource management information.

In step 412, the source CU transmits an RRC reconfiguration message to the UE, requesting the UE to perform handover.

The source CU determines to hand over the UE according to the measurement report and the radio resource management information. The source CU generates an RRC reconfiguration message according to parameters required for accessing the target cell during handover and transmits the RRC reconfiguration message to the UE to perform handover. The RRC reconfiguration message mainly includes a cell ID, carrier frequency, target power, and other radio resources and physical resource configurations.

In step 413, the UE transmits an RRC reconfiguration response to the target CU.

The UE completes uplink synchronization with the target cell. After receiving the RRC reconfiguration message containing a handover command, the UE disconnects with the source cell and establishes a new radio connection with the target cell. During this time period, the data transmission is interrupted. The establishing of the new radio connection with the target cell includes steps such as downlink synchronization establishment, timing advance, and data transmission. After successfully accessing the target cell, the UE transmits an RRC reconfiguration complete message to the target cell indicating that the handover is completed for the UE.

In step 414, the target CU transmits a path switch request to the core network.

Optionally, if required, the target CU transmits a message to notify the core network that the user has handed over to the target CU and the user plane needs to be handed over to the target CU. The path switch request may include information relevant to the user plane.

In step 415, the core network transmits a path switch response to the target CU.

In step 416, the target CU transmits a message to the target DU, notifying the target DU to start data transmission and reception. The target DU may also know that the UE has handed over to the cell that the target DU is located and data transmission and reception may be started after receiving data of the UE via the user plane or after performing the synchronization procedure with the UE. Thus, step 416 may be omitted.

In step 417, data transmission is started in the target cell.

During the handover procedure, if a target beam is also configured, the data is transmitted on the corresponding beam of the target cell. For example, if beam 3 is configured in the handover message, after handover, the data is transmitted on beam 3.

In step 418, the target CU transmits a message to the source CU to delete the UE information on the source CU, including UE context, UE protocol stack, bearer and all other UE information.

In step 419, the source CU transmits a message to the source DU to delete UE information on the source DU, including UE context, UE protocol stack, bearer and all other UE information.

In step 420, the source DU transmits a deletion response to the source CU.

In step 421, the source CU transmits a deletion response to the target CU.

Method 2, Direct Handover

In method 2, the source CU obtains information of one or some beams of the target DU, e.g., beam identifier, beam quality report, the beam quality is higher than a particular threshold, the beam quality report also reflects the signal quality of the cell, if the beam quality reaches a particular threshold, the source CU may determine to perform cell handover. Or, the source CU obtains not only the beam information of the target DU, but also the measurement report of the target cell, e.g., the source CU obtains the RRC transparent container, the RRC transparent container includes measurement report of an adjacent cell, or, the source CU obtains indication information indicating that the target cell meets a handover condition. The CU may determine to perform cell handover. The procedure is as follows:

Step 408, the source CU transmits a handover request message to the target CU.

The handover request message carries information necessary for the handover, e.g. handover reason, target cell ID, UE context information, SAE bearer ID, SAE bearer QoS parameters, RRC context information, etc. The target cell performs resource admit and allocates radio resources and service bearer resources for the UE.

In step 409, the target CU transmits a bearer setup request to the target DU.

The bearer setup request includes a cell identifier, a beam identifier and configurations corresponding to the bearer to be set up. The configurations corresponding to the bearer are relevant to the user plane functional split between the target CU and the target DU. For example, if the target DU has the RLC and MAC functions, the configurations corresponding to the bearer include configuration information for the RLC and MAC.

The bearer setup request includes the beam information, e.g., bean identifier, beam quality, etc. According to the beam information, the target DU knows that the signal quality of the beam meets a particular threshold and has a better quality and should transmit data to the UE on the beam. After receiving uplink access signals of the UE, the target DU may configure to transmit data to the UE on the beam, so as to reduce data interruption time cause by the handover.

In step 410, the target DU transmits a bearer setup response to the target CU.

The target DU allocates corresponding resources according to the bearer configuration information and transmits a response message to the target CU. The response message includes information about the allocation for the UE, e.g., random access resources allocated to the UE by the target DU.

In step 411, the target CU transmits a handover response to the source CU.

In step 412, the source CU transmits an RRC reconfiguration message to the UE, requesting the UE to perform handover.

The source CU determines to hand over the UE according to the measurement report and the radio resource management information. The source CU generates an RRC reconfiguration message according to parameters required for accessing the target cell during handover and transmits the RRC reconfiguration message to the UE to perform handover. The RRC reconfiguration message mainly includes a cell ID, carrier frequency, target power, and other radio resources and physical resource configurations.

In step 413, the UE transmits an RRC reconfiguration response to the target CU.

The UE completes uplink synchronization with the target cell. After receiving the RRC reconfiguration message containing a handover command, the UE disconnects with the source cell and establishes a new radio connection with the target cell. During this time period, the data transmission is interrupted. The establishing of the new radio connection with the target cell includes steps such as downlink synchronization establishment, timing advance, and data transmission. After successfully accessing the target cell, the UE transmits an RRC reconfiguration complete message to the target cell indicating that the handover is completed for the UE.

In step 414, the target CU transmits a path switch request to the core network.

Optionally, if required, the target CU transmits a message to notify the core network that the user has handed over to the target CU and the user plane needs to be handed over to the target CU. The path switch request may include information relevant to the user plane.

In step 415, the core network transmits a path switch response to the target CU.

In step 416, the target CU transmits a message to the target DU, notifying the target DU to start data transmission and reception. The target DU may also know that the UE has handed over to the cell that the target DU is located and data transmission and reception may be started after receiving data of the UE via the user plane or after performing the synchronization procedure with the UE. Thus, step 416 may be omitted.

In step 417, data transmission is started in the target cell.

During the handover procedure, if a target beam is also configured, the data is transmitted on the corresponding beam of the target cell. For example, if beam 3 is configured in the handover message, after handover, the data is transmitted on beam 3.

In step 418, the target CU transmits a message to the source CU to delete the UE information on the source CU, including UE context, UE protocol stack, bearer and all other UE information.

In step 419, the source CU transmits a message to the source DU to delete UE information on the source DU, including UE context, UE protocol stack, bearer and all other UE information.

In step 420, the source DU transmits a deletion response to the source CU.

In step 421, the source CU transmits a deletion response to the target CU.

Method 3, Configuring Multiple Connections, e.g. DC or CA

In method 3, the source CU obtains information of one or some beams of the target DU, e.g., beam identifier, beam quality report, the beam quality is higher than a particular threshold, the beam quality report also reflects the signal quality of the cell, if the beam quality reaches a particular threshold, the source CU determines to configure multiple connections for the UE. According to the user plane functional split manners between the target CU and the target DU, there may be various configuration manners for the multiple connections, e.g., double connections (DC), or carrier aggregation (CA). When multiple connections are configured, the cell on the source CU becomes a primary cell of the UE, the cell on the target CU becomes a secondary cell of the UE, the source CU is referred to as a primary CU and the target CU is referred to as a secondary CU. The detailed procedure is as follows:

In step 408, the primary CU transmits a cell/carrier add request to the secondary CU.

The cell/carrier add request message carries information necessary for the establishing of the multiple connections, e.g. target cell ID, UE context information, SAE bearer ID, SAE bearer QoS parameters, RRC context information, etc. The target cell performs resource admit and allocates radio resources and service bearer resources for the UE.

In step 409, the secondary CU transmits a cell/carrier add request to the target DU.

The cell/carrier add request message transmitted by the secondary CU carries information necessary for establishing the multiple connections, including: target cell ID, beam identifier, and may further include beam quality, configurations corresponding to the bearer to be set up. The configurations corresponding to the bearer are relevant to the user plane functional split between the target CU and the target DU. For example, if the target DU has RLC and MAC functions, the configurations corresponding to the bearer include configuration information for RLC and MAC.

The cell/carrier add request message transmitted by the secondary CU includes beam information, e.g. beam identifier, beam quality, etc. According to the beam information, the target DU is able to know that the signal quality of the beam meets a particular threshold and has a better quality and should transmit data to the UE on the beam. After receiving uplink access signals of the UE, the target DU may configure to transmit data to the UE on the beam. Thus, data interruption time caused by the handover may be reduced.

In step 410, the target DU transmits a cell/carrier add response to the secondary CU.

The target DU allocates corresponding resources according to the configuration information and then transmits a response message to the secondary CU. The response message includes information about the allocation to the UE, e.g., the random access resources allocated to the UE by the target DU.

In step 411, the secondary CU transmits a cell/carrier add response to the primary CU.

In step 412, the primary CU transmits an RRC reconfiguration message to the UE, requesting the UE to perform multi-connection configuration.

The primary CU determines to configure multiple connections for the UE according to the measurement report and the radio resource management information. The primary CU generates an RRC reconfiguration message according to parameters required for accessing the target cell in case of multiple connections and transmits the RRC reconfiguration message to the UE to configure the multiple connections. The RRC reconfiguration message mainly includes a cell ID, carrier frequency, target power, and other radio resources and physical resource configurations.

In step 413, the UE transmits an RRC reconfiguration response to the primary CU.

The UE completes uplink synchronization with the target cell. After receiving the RRC reconfiguration message containing the handover command, the UE starts to establish a new connection with the target cell, including steps such as downlink synchronization establishment, timing advance, data transmission, etc. When the UE successfully accesses the target cell, the UE transmits an RRC reconfiguration complete to the primary CU, indicating that the multi-connection procedure has been completed for the UE. It should be noted that, this step is different in the multi-connection method and the handover method. In the handover method, the message in step 413 is transmitted to the target CU. In the method of establishing multiple connections, however, the message of step 413 is transmitted to the primary CU, and the primary CU transmits the message to the secondary CU, informing the UE that multiple connections have been configured.

In step 414, the primary CU transmits a path switch request to a core network.

Optionally, if required, the target CU transmits a message to notify the core network that the user has handed over to the target CU and the user plane needs to be handed over to the target CU. The path switch request may carry information about the user plane.

In step 415, the core network transmits a path switch response to the primary CU.

In step 416, the secondary CU transmits a message to the target DU, informing the target DU that data receiving and transmission may be started. The target DU may also know that the UE has handed over to the cell where the target DU is located and data receiving and transmission may be started once receiving the data of the UE via the user plane or completes the synchronization procedure with the UE. Thus, step 416 may be omitted.

In step 417, data transmission is started in the target cell.

In the multi-connection procedure, if a target beam in the target cell is also configured, the data is transmitted on the corresponding beam of the target cell. For example, if beam 3 is configured in the bearer reconfiguration message, after the multiconnection, the data are transmitted on beam 1 of the source DU and the beam 3 of the target DU.

It should be noted that, in method 3, it is not required to delete the UE information on the primary CU and the source DU.

FIG. 5 is a flowchart illustrating a method for supporting movement of a UE by a central unit in wireless communications according to some embodiments of the present disclosure. It should be noted that, the method is executed by a central unit.

As shown in FIG. 5, in step 501, beam measurement configuration information is transmitted to the UE.

In step 502, information about a candidate beam transmitted by a distributed unit is received, wherein the information about the candidate beam is obtained by the distributed unit based on a beam measurement result, the beam measurement result is obtained by the UE through measuring received beam signals according to beam measurement configuration information.

In some embodiments, the method for supporting movement of the UE by the central unit in wireless communications provided by the present disclosure may further include: transmitting cell measurement configuration information to the UE; receiving a cell measurement result or an object about a cell measurement result; wherein the cell measurement result or the object about the cell measurement result is obtained by the UE through measuring signals of an adjacent cell according to the cell measurement configuration information; determining a candidate cell meeting a UE using condition as a target cell according to the cell measurement result or the object about the cell measurement result, and determining a distributed unit corresponding to the target cell as a target distributed unit, wherein the candidate cell is a cell that the candidate beam belongs to.

In some embodiments, the method for supporting movement of the UE by the central unit in wireless communications provided by the present disclosure may further include: if the central unit is the one corresponding to the candidate distributed unit, transmitting a bearer setup request for the UE to the candidate distributed unit, wherein the candidate distributed unit is the one controlling the candidate beam; receiving a bearer setup response transmitted by the candidate distributed unit; transmitting an RRC reconfiguration message for accessing the target cell to the UE; receiving an RRC reconfiguration response transmitted by the UE.

In some embodiments, the method for supporting movement of the UE by the central unit in wireless communications provided by the present disclosure may further include: directly determining the candidate beam as a target beam, determining the cell that the candidate beam belongs to as the target cell, determining the distributed unit corresponding to the target cell as the target distributed unit.

In some embodiments, the method for supporting movement of the UE by the central unit in wireless communications provided by the present disclosure may further include: if the central unit is the one corresponding to the target distributed unit, transmitting a bearer setup request of the UE to the target distributed unit; receiving a bearer setup response transmitted by the target distributed unit; transmitting an RRC reconfiguration message for accessing the target cell to the UE; and receiving an RRC reconfiguration response transmitted by the UE.

In some embodiments, the method for supporting movement of the UE by the central unit in wireless communications provided by the present disclosure may further include: determining whether to configure multiple connections for the UE according to information of the candidate beam; if the central unit is the one corresponding to the target distributed unit and it is determined to configure multiple connections for the UE, transmitting a cell/carrier add request for the UE to the target distributed unit; receiving a cell/carrier add response message transmitted by the target distributed unit; transmitting an RRC reconfiguration message for accessing the target cell to the UE; and receiving an RRC reconfiguration response message transmitted by the UE.

In some embodiments, the method for supporting movement of the UE by the central unit in wireless communications provided by the present disclosure may further include: after the UE establishes the connection with the target distributed unit, transmitting a deletion message to the distributed unit to delete information of the UE; and receiving a deletion response message transmitted by the distributed unit.

In some embodiments, the method for supporting movement of the UE by the central unit in wireless communications provided by the present disclosure may further include: after the connection between the UE and the target cell is established, transmitting a message to the target distributed unit indicating that the UE has been connected with the target cell.

In some embodiments, the method for supporting movement of the UE by the central unit in wireless communications provided by the present disclosure may further include: if the candidate distributed unit corresponds to a candidate central unit different from the current central unit, transmitting a handover request message for a UE to the candidate central unit; receiving a handover response message transmitted by the candidate central unit; transmitting an RRC reconfiguration message for accessing the target cell to the UE; receiving an RRC reconfiguration response message transmitted by the UE; wherein the candidate distributed unit and the candidate central unit are respectively the distributed unit and the central unit corresponding to the candidate beam.

In some embodiments, the method for supporting movement of the UE by the central unit in wireless communications provided by the present disclosure may further include: if the target distributed unit corresponds to a target central unit different from the current central unit, transmitting a handover request message for the UE to the target central unit; receiving a handover response message transmitted by the target central unit; transmitting an RRC reconfiguration message for accessing the target cell to the UE; and receiving an RRC reconfiguration response message transmitted by the UE.

In some embodiments, the method for supporting movement of the UE by the central unit in wireless communications provided by the present disclosure may further include: determining whether to configure multiple connections for the UE according to information of the candidate beam; if the target distributed unit corresponds to a target central unit different from the current central unit and it is determined to configure multiple connections for the UE, transmitting a cell/carrier add request for the UE to the target central unit; receiving a cell/carrier add response message transmitted by the target central unit; transmitting an RRC reconfiguration message for accessing the target cell to the UE; and receiving an RRC reconfiguration response message transmitted by the UE.

In some embodiments, the method for supporting movement of the UE by the central unit in wireless communications provided by the present disclosure may further include: after the connection between the UE and the target cell is established, transmitting a path switch request message to a core network to inform the core network that the UE has handed over to the target central unit; and receiving a path switch response message transmitted by the core network.

In some embodiments, the method for supporting movement of the UE by the central unit in wireless communications provided by the present disclosure may further include: after the connection between the UE and the target cell is established, receiving a deletion message transmitted by the target central unit indicating to delete information of the UE; in response to the deletion message, deleting information of the UE and transmitting a deletion message to the distributed unit to indicate the distributed unit to delete information of the UE; receiving a deletion response message transmitted by the distributed unit; and transmitting a deletion response message to the target central unit.

In some embodiments, the method for supporting movement of the UE by the central unit in wireless communications provided by the present disclosure may further include: transmitting beam measurement configuration information to the distributed unit.

In some embodiments, the method for supporting movement of the UE by the central unit in wireless communications provided by the present disclosure may further include: receiving a handover request message for another UE transmitted by another central unit, in response to the handover request message, transmitting a bearer setup request message for the other UE to a corresponding distributed unit; receiving a bearer setup response message transmitted by the corresponding distributed unit;

transmitting a handover response message to the other central unit. That is to say, in this case, the central unit acts as a target central unit or a candidate central unit.

In some embodiments, the method for supporting movement of the UE by the central unit in wireless communications provided by the present disclosure may further include: receiving a cell/carrier add request message for another UE transmitted by another central unit; in response to the cell/carrier add request message, transmitting a cell/carrier add request message for the other UE to a corresponding distributed unit; receiving a cell/carrier add response message transmitted by the corresponding distributed unit; and transmitting a cell/carrier add response message to the other central unit. That is to say, in this case, the central unit acts as a target central unit.

In some embodiments, the method for supporting movement of the UE by the central unit in wireless communications provided by the present disclosure may further include: after a connection is established between the other UE and the cell corresponding to the corresponding distributed unit, transmitting a path switch request message to the core network to inform the core network that the UE has handed over to the central unit; receiving a path switch response message transmitted by the core network. In this case, the central unit acts a target central unit.

It should be understood that, the method for supporting movement of the UE by the central unit in wireless communications provided by the present embodiment may be implemented with reference to FIGS. 3 and 4, and the detailed implementation is not repeated herein.

FIG. 6 is a flowchart illustrating a method for supporting movement of a UE by a distributed unit in wireless communications according to some embodiments of the present disclosure. It should be noted that this method is executed by a distributed unit.

As shown in FIG. 6, in step 601, resources for beam measurement report are configured for a UE.

In step 602, a beam measurement result reported by the UE is received.

In step 603, information about a candidate beam is reported to a central unit according to the beam measurement result.

In some embodiments, the method of supporting movement of the UE by the distributed unit in the wireless communications of embodiments of the present disclosure may further include: if the distributed unit is the one controlling the candidate beam, directly determining the candidate beam as a target beam, and performing data transmission with the UE using the target beam.

In some embodiments, the method of supporting movement of the UE by the distributed unit in the wireless communications of embodiments of the present disclosure may further include: forwarding an object about a cell measurement result to the central unit; wherein the object about the cell measurement result and information of the candidate beam are carried in a same message.

In some embodiments, the method of supporting movement of the UE by the distributed unit in the wireless communications of embodiments of the present disclosure may further include: receiving beam measurement configuration information transmitted by the central unit, and saving the beam measurement configuration information in UE context.

It should be noted that, the method for supporting movement of the UE by the distributed unit in wireless communications provided by the present embodiment may be implemented with reference to FIGS. 3 and 4, and the detailed implementation is not repeated herein.

FIG. 7 is a schematic diagram illustrating a structure of a base station for supporting movement of a UE in wireless communications according to some embodiments of the present disclosure. As shown in FIG. 7, the base station for supporting movement of the UE in the wireless communications provided by the embodiments of the present disclosure may include: a central unit 701 and a distributed unit 702.

The central unit 701 is to transmit beam measurement configuration information to the UE.

The distributed unit 702 is to configure resources for beam measurement reporting for the UE, and report information about a candidate beam to the central unit 701 according to a beam measurement result reported by the UE.

In some embodiments, if the distributed unit 702 is the one controlling the candidate beam, the distributed unit 702 directly determines the candidate beam to be a target beam and implements data transmission with the UE via the target beam.

In some embodiments, the central unit 701 transmits cell measurement configuration information to the UE, determines a candidate cell meeting a UE using condition as a target cell according to a cell measurement result or an object about a cell measurement result reported by the UE, and determines a distributed unit 702 corresponding to the target cell to be a target distributed unit; wherein the candidate cell is a cell that candidate beam belong to.

In some embodiments, the object about the cell measurement result may be carried in the beam measurement result and transmitted to the distributed unit 702, and then forwarded to the central unit 701 by the distributed unit 702.

In some embodiments, if the central unit 701 is the one corresponding to the candidate distributed unit, the central unit 701 may transmit a bearer setup request message for the UE to the candidate distributed unit, after receiving a bearer setup response message transmitted by the candidate distributed unit, transmits an RRC reconfiguration message for accessing the target cell to the UE, and receiving an RRC reconfiguration response message transmitted by the UE; wherein the candidate distributed unit is a distributed unit controlling the candidate beam.

In some embodiments, the central unit 701 may directly determine the candidate beam as the target beam, determine the cell that the target beam belongs to as the target cell, and determine the distributed unit 702 corresponding to the target cell as the target distributed unit.

In some embodiments, if the central unit 701 is the one corresponding to the target distributed unit, the central unit 701 may transmit a bearer setup request message for the UE to the target distributed unit, after receiving a bearer setup response message transmitted by the target distributed unit, transmit an RRC reconfiguration message for accessing the target cell to the UE, and receive an RRC reconfiguration response message transmitted by the UE.

In some embodiments, the central unit 701 may determine whether to configure multiple connections for the UE according to the information about the candidate beam, if the central unit 701 is the one corresponding to the target distributed unit and it is determined to configure multiple connections for the UE, the central unit 701 transmits a cell/carrier add request message for the UE to the target distributed unit, after receiving a cell/carrier add response message transmitted by the target distributed unit, the central unit 701 transmits an RRC reconfiguration message for accessing the target cell to the UE, and receives an RRC reconfiguration response message transmitted by the UE.

In some embodiments, the manner of the multiple connections is relevant to user plane functional split between the central unit 701 and the target distributed unit.

In some embodiments, the bearer setup request message may include: cell identifier, beam identifier, and configurations corresponding to the bearer to be set up; wherein the configurations corresponding to the bearer to be set up are relevant to user plane functional split between the central unit 701 and the target distributed unit.

In some embodiments, after the connection between the UE and the target cell is established, the central unit 701 may transmit a deletion message to the distributed unit 702 indicating to delete information of the UE; wherein the distributed unit 702 deletes the information of the UE in response to the deletion message and transmits a deletion response message to the central unit 701.

In some embodiments, after the connection between the UE and the target cell is established, the central unit 701 may transmit a message to the target distributed unit indicating that the UE has been connected with the target cell.

In some embodiments, if the candidate distributed unit corresponds to a candidate central unit different from the current central unit 701, the central unit 701 may transmit a handover request message for the UE to the candidate central unit, receive a handover response message transmitted by the candidate central unit, transmit an RRC reconfiguration message for accessing the target cell to the UE, and receive an RRC reconfiguration response message transmitted by the UE; wherein the candidate distributed unit and the candidate central unit are respectively the distributed unit and the central unit corresponding to the candidate beam.

In some embodiments, if the target distributed unit corresponds to a target central unit different from the current central unit 701, the central unit 701 may transmit a handover request message for the UE to the target central unit, receive a handover response message transmitted by the target central unit, transmit an RRC reconfiguration message for accessing the target cell to the UE, and receive an RRC reconfiguration response message transmitted by the UE.

In some embodiments, the central unit 701 may determine whether to configure multiple connections for the UE according to the information of the candidate beam, if the target distributed unit corresponds to a target central unit different from the current central unit 701 and it is determined to configure multiple connections for the UE, the central unit 701 transmits a cell/carrier add request message for the UE to the target central unit, receives a cell/carrier add response message transmitted by the target central unit, transmits an RRC reconfiguration message for accessing the target cell to the UE, and receives an RRC reconfiguration response message transmitted by the UE.

In some embodiments, the manner of the multiple connections may be relevant to the user plane functional split between the target central unit and the target distributed unit.

In some embodiments, after the connection between the UE and the target cell is established, the central unit 701 transmits a path switch request message to the core network to inform the core network that the UE has been handed over to the target central unit, and receives a path switch response message transmitted by the core network.

In some embodiments, in response to a deletion message received from the target central unit, the central unit 701 deletes information of the UE, and transmits a deletion message to the distributed unit 702 indicating to delete the information of the UE, after receiving a deletion response message transmitted by the distributed unit 702, the central unit 701 transmits a deletion response message to the target central unit; wherein the distributed unit 702 deletes the information of the UE in response to the deletion message and transmits the deletion response message to the central unit 701.

In some embodiments, the bearer setup request message may include: a cell ID, a beam identifier, and configurations corresponding to the bearer to be set up, wherein the configurations corresponding to the bearer to be set up are relevant to the user plane functional split between the target central unit and the target distributed unit.

In some embodiments, the central unit 701 may transmit beam measurement configuration information to the distributed unit 702, wherein the distributed unit 702 saves the beam measurement configuration information is UE context.

It should be noted that the base station supporting movement of the UE in the wireless communications provided by the embodiments of the present disclosure may be implemented with reference to the embodiments as shown in FIGS. 3 and 4, the details are not repeated herein.

FIG. 8 is a schematic diagram illustrating a structure of a central unit for supporting movement of a UE in wireless communications according to some embodiments of the present disclosure. As shown in FIG. 8, the central unit for supporting the movement of the UE in the wireless communications provided by the embodiments of the present disclosure may include: an RRC functional module 801 and a beam information receiving module 802.

The RRC functional module 801 is to transmit beam measurement configuration information to the UE.

The beam information receiving module 802 is to receive information of a candidate beam transmitted by a distributed unit, wherein the information of the candidate beam is obtained by the distributed unit based on a beam measurement result; the beam measurement result is obtained by the UE through measuring received beam signals based on the beam measurement configuration information.

In some embodiments, the RRC functional module 801 may transmit cell measurement configuration information to the UE, and receive a cell measurement result transmitted by the UE, wherein the cell measurement result is obtained by the UE through measuring signals of an adjacent cell according to the cell measurement configuration information. The central unit for supporting movement of the UE in the wireless communications provided by the embodiments of the present disclosure may further include: a target cell determining module (not shown), to determine a candidate cell meeting a UE using condition as a target cell according to the cell measurement result, and determine a distributed unit corresponding to the target cell as a target distributed unit, wherein the candidate cell is a cell that candidate beam belong to.

In some embodiments, the RRC functional module 801 may transmit cell measurement configuration information to the UE, the target cell determining module may determine a candidate cell meeting the UE using condition as the target cell according to an object about the cell measurement result, and determine the distributed unit corresponding to the target cell as the target distributed unit; wherein the candidate cell is a cell that the candidate beam belong to, the object about the cell measurement result is carried in the beam measurement result and transmitted to the distributed unit, and then forwarded to the central unit by the distributed unit.

In some embodiments, the central unit for supporting movement of the UE in the wireless communications provided by the embodiments of the present disclosure may further include: a bearer setup module (not shown), to transmit a bearer setup request message for the UE to a candidate distributed unit if the central unit is the one corresponding to the candidate distributed unit, wherein the candidate distributed unit is a distributed unit controlling the candidate beam; and to receive a bearer setup response message transmitted by the candidate distributed unit; wherein the RRC functional module 801 transmits an RRC reconfiguration message for accessing the target cell to the UE, and receives an RRC reconfiguration response message transmitted by the UE.

In some embodiments, the target cell determining module may directly determine the candidate beam as the target beam, determine the cell that the candidate beam belongs to as the target cell, and determine the distributed unit corresponding to the target cell as the target distributed unit.

In some embodiments, the central unit for supporting movement of the UE in the wireless communications provided by the embodiments of the present disclosure may further include: a bearer setup module (not shown), to transmit a bearer setup request message to the target distributed unit if the central unit is the one corresponding to the target distributed unit, and to receive a bearer setup response message transmitted by the target distributed unit; wherein the RRC functional module 801 transmits an RRC reconfiguration message for accessing the target cell to the UE, and receives an RRC reconfiguration response message transmitted by the UE.

In some embodiments, the central unit for supporting movement of the UE in the wireless communications provided by the embodiments of the present disclosure may further include: a multi-connection determining module (not shown), to determine whether to configure multiple connections for the UE according to information of the candidate beam; the bearer setup module (not shown) is to transmit, if the central unit is still the one corresponding to the target distributed unit and it is determined to configure multiple connections for the UE, a cell/carrier add request message for the UE to the target distributed unit, receive a cell/carrier add response message transmitted by the target distributed unit, wherein the RRC functional module 801 transmits an RRC reconfiguration message for accessing the target cell to the UE, and receives an RRC reconfiguration response message transmitted by the UE.

In some embodiments, the central unit for supporting movement of the UE in the wireless communications provided by the embodiments of the present disclosure may further include: an information deleting module (not shown), to transmit, after the connection between the UE and the target cell is established, a deletion message to the distributed unit to indicate the distributed unit to delete information of the UE, and to receive a deletion response message transmitted by the distributed unit.

In some embodiments, the central unit for supporting movement of the UE in the wireless communications provided by the embodiments of the present disclosure may further include: a notifying module (not shown), to transmit, after the connection between the UE and the target cell is established, a message to the target distributed unit indicating that the connection between the UE and the target cell is established.

In some embodiments, the central unit for supporting movement of the UE in the wireless communications provided by the embodiments of the present disclosure may further include: a handover module (not shown), to transmit, if the candidate distributed unit corresponds to a candidate central unit different from the current central unit, a handover request message for the UE to the candidate central unit, and receive a handover response message transmitted by the candidate central unit; wherein the RRC functional module 801 transmits an RRC reconfiguration message for accessing the target cell to the UE, and receives an RRC reconfiguration response message transmitted by the UE; the candidate distributed unit and the candidate central unit are respectively the distributed unit and the central unit corresponding to the candidate beam.

In some embodiments, the central unit for supporting movement of the UE in the wireless communications provided by the embodiments of the present disclosure may further include: a handover module (not shown), to transmit, if the target distributed unit corresponds to a target central unit different from the current central unit, a handover request message for the UE to the target central unit, and receive a handover response message transmitted by the target central unit; wherein the RRC functional module 801 transmits an RRC reconfiguration message for accessing the target cell to the UE, and receives an RRC reconfiguration response message transmitted by the UE.

In some embodiments, the central unit for supporting movement of the UE in the wireless communications provided by the embodiments of the present disclosure may further include: a multi-connection determining module (not shown), to determine whether to configure multiple connections for the UE according to the information of the candidate beam; a handover module, to transmit, if the target distributed unit corresponds to a target central unit different from the current central unit and it is determined to configure multiple connections, a cell/carrier add request message for the UE to the target central unit, and receive a cell/carrier add response message transmitted by the target central unit; wherein the RRC functional module 801 transmits an RRC reconfiguration message for accessing the target cell to the UE, and receives an RRC reconfiguration response message transmitted by the UE.

In some embodiments, the central unit for supporting movement of the UE in the wireless communications provided by the embodiments of the present disclosure may further include: a handover notifying module (not shown), to transmit, after the connection between the UE and the target cell is established, a path switch request message to the core network to notify the core network that the UE is handed over to the target central unit; and to receive a path switch response message transmitted by the core network.

In some embodiments, the central unit for supporting movement of the UE in the wireless communications provided by the embodiments of the present disclosure may further include: an information deleting module (not shown), to receive, after the connection between the UE and the target cell is established, a deletion message transmitted by the target central unit indicating to delete information of the UE, delete the information of the UE in response to the deletion message and transmit a deletion message to the distributed unit indicating the distributed unit to delete the information of the UE, receive a deletion response message transmitted by the distributed unit and transmit a deletion response message to the target central unit.

In some embodiments, the central unit for supporting movement of the UE in the wireless communications provided by the embodiments of the present disclosure may further include: a beam information transmitting unit (not shown), to transmit beam measurement configuration information to the distributed unit.

In some embodiments, the handover module may receive a handover request message for another UE transmitted by another central unit, in response to the handover request, transmit a bearer setup request message for the another UE to a corresponding distributed unit, receive a bearer setup response message transmitted by the corresponding distributed unit, and transmit a handover response message to the another central unit.

In some embodiments, the handover module may receive a cell/carrier add request message for another UE transmitted by another central unit, in response to the cell/carrier add request message, transmit a cell/carrier add request message for the another UE to a corresponding distributed unit, receive a cell/carrier add response message transmitted by the corresponding distributed unit, and transmit a cell/carrier add response message to the another central unit.

In some embodiments, the handover notifying module may transmit, after the connection between the another UE and the cell corresponding to the corresponding distributed unit is established, a path switch request message to the core network to notify the core network that the UE is handed over to the central unit, and receive a path switch response message transmitted by the core network.

It should be noted that, the central unit for supporting movement of the UE in the wireless communications provided by the embodiments of the present disclosure may be implemented with reference to the embodiments as shown in FIGS. 3 and 4, the details are not repeated herein.

In some embodiments of the present invention, the central unit may be realized by equipping a controller and a transceiver.

In some embodiments, the RRC functional module 801 may be implemented by the controller, and the beam information receiving module 802 may be implemented by the transceiver.

FIG. 9 is a schematic diagram illustrating a structure of a distributed unit for supporting movement of a UE in wireless communications according to some embodiments of the present disclosure. As shown in FIG. 9, the distributed unit for supporting the movement of the UE in the wireless communications provided by the embodiments of the present disclosure may include: a resource configuring module 901, a beam information receiving module 902 and a beam information transmitting module 903.

The resource configuring module 901 is to configure resources for beam measurement reporting for the UE.

The beam information receiving module 902 is to receive a beam measurement result reported by the UE.

The beam information transmitting module 903 is to report information of a candidate beam to a central unit according to the beam measurement result.

In some embodiments, the distributed unit for supporting movement of the UE in the wireless communications provided by the embodiments of the present disclosure may further include: a target beam determining module (not shown), to determine, if the distributed unit is the one controlling the candidate beam, the candidate beam as the target beam, and implement data transmission with the UE via the target beam.

In some embodiments, the beam information transmitting module 903 may forward an object about a cell measurement result to the central unit, wherein the object about the cell measurement result is carried in the same message with the information of the candidate beam.

In some embodiments, the distributed unit for supporting movement of the UE in the wireless communications provided by the embodiments of the present disclosure may further include: an information deleting module (not shown), to receive a deletion message transmitted by the central unit indicating the distributed unit to delete information of the UE, delete the information of the UE in response to the deletion message and transmit a deletion response message to the central unit.

In some embodiments, the distributed unit for supporting movement of the UE in the wireless communications provided by the embodiments of the present disclosure may further include: a beam configuration receiving module (not shown), to receive beam measurement configuration information transmitted by the central unit; and a beam configuration saving module (not shown), to save the beam measurement configuration information in UE context.

It should be noted that, the distributed unit for supporting movement of the UE in the wireless communications provided by the embodiments of the present disclosure may be implemented with reference to the embodiments as shown in FIGS. 3 and 4, the details are not repeated herein.

In some embodiments of the present invention, the distributed unit may be realized by equipping a controller and a transceiver.

In some embodiments, the resource configuring module 901 may be implemented by the controller, and the beam information receiving module 902 or the beam information transmitting module 903 may be implemented by the transceiver.

The above-described operations may be realized by equipping a memory device retaining their corresponding codes in an entity, function, base station, or any component of a terminal in a communication system. That is, the controller in the entity, the function, the base station, or the terminal may execute the above-described operations by reading and executing the program codes stored in the memory device by a processor or central processing unit (CPU).

As described herein, various components or modules in the entity, function, eNB, or UE may be operated using a hardware circuit, e.g., a complementary metal oxide semiconductor-based logic circuit, firmware, software, and/or using a hardware circuit such as a combination of hardware, firmware, and/or software embedded in a machinereadable medium. As an example, various electric structures and methods may be executed using electric circuits such as transistors, logic gates, or ASICs. According to the method and apparatus for supporting movement of the UE provided by the embodiments of the present disclosure, it is possible to support movement of the UE, set up multiple bearers for the UE, and implement network resources sharing. Further, scheduling of the resources is more flexible.

The invention claimed is:

1. A method for supporting movement of a user equipment (UE) by a central unit (CU) in wireless communications, the method comprising:
   transmitting beam measurement configuration information to the UE;
   receiving, from a distributed unit (DU), information on a beam of another DU;
   transmitting cell measurement configuration information to the UE;
   receiving, from the UE, a cell measurement result obtained based on the cell measurement configuration information;
   determining whether a cell supporting the beam of the another DU becomes a target cell for the UE based on the cell measurement result; and
   determining the another DU supporting the target cell as a target DU in response to the determination that the cell supporting the beam of the another DU becomes the target cell,
   wherein the information on the beam is obtained by the DU based on a beam measurement result, and
   wherein the beam measurement result is obtained from the UE based on the beam measurement configuration information.

2. The method of claim 1, wherein the cell measurement configuration information and the beam measurement configuration information are carried in a measurement configuration message.

3. The method of claim 1, wherein the cell measurement result is transmitted to the DU via the beam measurement result, and is forwarded to the CU by the DU.

4. The method of claim 1, wherein the CU supports the target DU, and the method further comprises:
   transmitting a bearer setup request message for the UE to the target DU;
   receiving a bearer setup response message transmitted by the target DU;
   transmitting an radio resource control (RRC) reconfiguration message for accessing the target cell to the UE; and
   receiving an RRC reconfiguration response message transmitted by the UE.

5. The method of claim 1, wherein the CU supports to the target DU, and the method further comprises:
   determining to configure multiple connections for the UE based on the information of the beam;
   transmitting a cell/carrier add request message for the UE to the target DU;
   receiving a cell/carrier add response message transmitted by the target DU;
   transmitting an radio resource control (RRC) reconfiguration message for accessing the target cell to the UE; and
   receiving an RRC reconfiguration response message transmitted by the UE.

6. The method of claim 1, wherein the CU does not support the target DU, and the method further comprises:
   determining a target CU supporting the target DU;
   transmitting a handover request message for the UE to the target CU;

receiving a handover response message transmitted by the target CU;

transmitting a radio resource control (RRC) reconfiguration message for accessing the target cell to the UE; and receiving a RRC reconfiguration response message transmitted by the UE.

7. The method of claim 1, wherein the CU does not correspond to the target DU, and the method further comprises:

determining to configure multiple connections according to the information of the beam;

determining a target CU supporting the target DU;

transmitting a cell/carrier add request message of the UE to the target CU;

receiving a cell/carrier add response message transmitted by the target CU;

transmitting a radio resource control (RRC) message for accessing the target cell to the UE; and receiving a RRC reconfiguration response message transmitted by the UE.

8. The method of claim 1, further comprising:

receiving a handover request message for another UE transmitted by another CU;

transmitting a bearer setup request message for the another UE in response to the handover request message, to a DU corresponding to the another CU;

receiving a bearer setup response message transmitted by the DU corresponding to the another CU; and transmitting a handover response message to the another CU.

9. The method of claim 1, further comprising:

receiving a cell/carrier add request message for another UE transmitted by another CU;

transmitting a cell/carrier add request message for the another UE in response to the cell/carrier add request message, to a DU corresponding to the another CU;

receiving a cell/carrier add response message transmitted by the DU corresponding to the another CU; and transmitting a cell/carrier add response message to the another CU.

10. An apparatus for supporting movement of a user equipment (UE) in wireless communications, the apparatus comprising:

a transceiver; and a processor configured to control the transceiver to:

transmit beam measurement configuration information to the UE;

receive, from a distributed unit (DU), information on a beam of another DU;

control the transceiver to transmit cell measurement configuration information to the UE;

control the transceiver to receive, from the UE, a cell measurement result obtained based on the cell measurement configuration information;

determine whether a cell supporting the beam of the another DU becomes a target cell for the UE based on the cell measurement result, and determine the another DU supporting the target cell as a target DU in response to the determination that the cell supporting the beam of the another DU becomes the target cell, wherein the information of the beam is obtained by the DU based on a beam measurement result, and wherein the beam measurement result is obtained from the UE based on the beam measurement configuration information.

11. The apparatus of claim 10, wherein the cell measurement configuration information and the beam measurement configuration information are carried in a measurement configuration message.

12. The apparatus of claim 10, wherein the cell measurement result is transmitted to the DU via the beam measurement result, and is forwarded to the CU by the DU.

13. The apparatus of claim 10, wherein the processor is further configured to control the transceiver to:

receive a handover request message for another UE transmitted by another CU;

transmit a bearer setup request message for the another UE in response to the handover request message, to a DU corresponding to the another CU;

receive a bearer setup response message transmitted by the DU corresponding to the another CU; and transmit a handover response message to the another CU.

14. The apparatus of claim 10, wherein the processor is further configured to control the transceiver to:

receive a cell/carrier add request message for another UE transmitted by another CU;

transmit a cell/carrier add request message for the another UE in response to the cell/carrier add request message, to a DU corresponding to the another CU;

receive a cell/carrier add response message transmitted by the DU corresponding to the another CU; and transmit a cell/carrier add response message to the another CU.

* * * * *